US004001769B2

United States Statutory Invention Registration [19]

[11] Reg. Number: H1769

LeClair et al. [45] Published: Jan. 5, 1999

[54] OPTIMIZED RECURSIVE FOUNDRY TOOLING FABRICATION METHOD

[75] Inventors: Steven R. LeClair, Spring Valley, Ohio; Stephen C. Gregory, San Antonio; Benny L. Carreon, Atascosa, both of Tex.; Yoh-Han Pao; Ron Cass, both of Cleveland Heights, Ohio; Kam Komeyli, Cleveland, Ohio

[73] Assignee: The United States of America as represented by the Secretary of the Air Force, Washington, D.C.

[21] Appl. No.: 466,008

[22] Filed: Jun. 6, 1995

[51] Int. Cl.[6] ..... B22C 7/00

[52] U.S. Cl. ..... 164/6; 164/1; 164/45; 164/456

[58] Field of Search ..... 364/474.24, 468.03, 364/219, 474.05; 164/27, 456, 32, 108, 516, 45; 156/500; 264/221, 219; 72/350

[56] References Cited

U.S. PATENT DOCUMENTS

| | | | |
|---|---|---|---|
| 4,144,927 | 3/1979 | Emerton et al. | 164/108 |
| 4,276,922 | 7/1981 | Brookes | 164/27 |
| 4,424,183 | 1/1984 | Nelson | 264/221 |
| 4,442,884 | 4/1984 | Kunsch | 164/456 |
| 4,487,246 | 12/1984 | Frasier | 164/32 |
| 4,888,082 | 12/1989 | Fetcenko et al. | 156/500 |
| 4,915,159 | 4/1990 | Damm et al. | 164/456 |
| 4,958,674 | 9/1990 | Bolle | 164/456 |
| 5,072,782 | 12/1991 | Namba et al. | 164/45 |
| 5,154,219 | 10/1992 | Watson et al. | 164/46 |
| 5,184,496 | 2/1993 | Namba et al. | 72/350 |
| 5,309,366 | 5/1994 | Grenkowitz | 364/474.24 |
| 5,385,705 | 1/1995 | Malloy et al. | 264/219 |
| 5,452,219 | 9/1995 | Dehoff et al. | 364/474.05 |
| 5,465,780 | 11/1995 | Muntner et al. | 164/516 |
| 5,498,387 | 3/1996 | Carter et al. | 264/219 |
| 5,546,313 | 8/1996 | Masters | 364/468.03 |

*Primary Examiner*—Bernarr E. Gregory
*Attorney, Agent, or Firm*—Bobby D. Scearce; Thomas L. Kundert

[57] ABSTRACT

A method for producing a pattern for making a cast part is described which comprises the steps of defining the structure of the part in terms of computer aided design system data, selecting a parting surface for the part to be cast; defining core requirements for the part by sweeping each positive feature of the part to the parting surface, subtracting the part from the projection, adding any remaining volume to the core, sweeping negative features away from the parting surface to the top or bottom of the mold and subtracting the negative features from the projection and intersecting the remainder of the part and adding any remaining volume to the core; repetitively generating alternative parting surfaces for the part and defining the corresponding core requirements whereby an optimum parting surface is defined for which the quantity and complexity of the corresponding core requirements are minimized, constructing core prints for each core requirement; constructing a pattern by adding the core prints to the part; and defining draft for the pattern surfaces perpendicular to the optimum parting surface.

2 Claims, 13 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTIMIZED RECURSIVE FOUNDRY TOOLING FABRICATION METHOD

RIGHTS OF THE GOVERNMENT

The invention described herein may be manufactured and used by or for the Government of the United States for all governmental purposes without the payment of any royalty.

BACKGROUND OF THE INVENTION

The present invention relates generally to metal casting methods, and more particularly to a method for efficiently producing a metal casting mold for a complex part by recursively identifying the cores for the casting and the molds for making the cores defining the complex part once a parting surface for the part is defined.

In metal casting discrete mechanical parts using sand molds, patterns are used in fabrication of the molds to ensure that the resulting cast parts have the correct geometry, or can be readily finished to the correct geometry. The pattern is a model of a part to form a mold cavity substantially defining the part shape, but is not simply a facsimile of the part because additional shapes (sprues, runners, gates, etc) are used to form channels for inserting molten metal, or shape modifications to provide taper (draft) on some surfaces of the part to facilitate withdrawal of the part from the mold. The principal molding material conventionally used in foundries is silica sand, which, when mixed with water and a binder (e.g. clay), can be formed to a complex geometry which retains its shape while being filled with metal and allowed to cool. The mold is usually destroyed when the casting is removed and must be recreated using the pattern for each cast part to be produced.

Mold design and fabrication are especially difficult if the cast part has sufficiently complex geometry or when the parting surface is defined such that the pattern cannot be withdrawn easily from the mold. In order to accommodate complex geometries by means of conventional casting methods, the pattern maker uses cores and loose pieces to ensure that those parts of the cavity which should be filled are filled. In standard practice, molds are often made up of two halves. The pattern is also made up of two parts mounted on the two sides of a board which represents the dividing (parting) surface (which may be more complex than a single plane) between the two mold halves. The two mold halves are formed by packing sand around each side of the pattern board, and subsequently combined to form the cavity left when the pattern is removed. The mold must therefore be made such that the pattern can be withdrawn from the mold. If the mold is made in two halves, each part of the pattern must be removable from the corresponding mold half. In order to define the casting pattern, the pattern maker modifies the pattern around the complex features of the part (to render it removable from the mold) using extra pieces of mold-like material, called cores or loose pieces, for filling extraneous spaces around the correct cavity shape for the cast part. The cores are generally made from bonded silica sand, and the molds used to make the cores, called core boxes, are permanent molds, usually made of wood or hardened epoxy.

In the practice of the invention, computer associative memories and feature-based computer aided design (CAD) are incorporated into a highly efficient and effective method for producing patterns and molds for casting substantially any complex part wherein withdrawal interferences of the pattern are defined for various parting planes or surfaces, and, once the parting surface is specified, the correct pattern structure is recursively defined.

It is a principal object of the invention to automate and optimize foundry tooling fabrication for metal casting.

It is another object of the invention to provide a method for producing a pattern for a part to be cast in a metal casting process.

It is another object of the invention to provide a method for sequentially drafting a pattern by part feature, core and rigging relative to a parting plane of a casting mold.

It is another object of the invention to provide a method for producing casting patterns for complex cast parts which cannot be otherwise withdrawn from a mold without destroying the mold.

It is a yet further object of the invention to provide a solid modelling recursive molding procedure for defining casting pattern core and core box requirements.

These and other objects of the invention will become apparent as a detailed description of representative embodiments proceeds.

SUMMARY OF THE INVENTION

In accordance with the foregoing principles and objects of the invention, a method for producing a pattern for making a cast part is described which comprises the steps of defining the structure of the part in terms of computer aided design system data, selecting a parting surface for the part to be cast; defining core requirements for the part by sweeping each positive feature of the part to the parting surface, subtracting the part from the projection, adding any remaining volume to the core, sweeping negative features away from the parting surface to the top or bottom of the mold and subtracting the negative features from the projection and intersecting the remainder of the part and adding any remaining volume to the core; repetitively generating alternative parting surfaces for the part and defining the corresponding core requirements whereby an optimum parting surface is defined for which the quantity and complexity of the corresponding core requirements are minimized, constructing core prints for each core requirement; constructing a pattern by adding the core prints to the part; and defining draft for the pattern surfaces perpendicular to the optimum parting surface.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
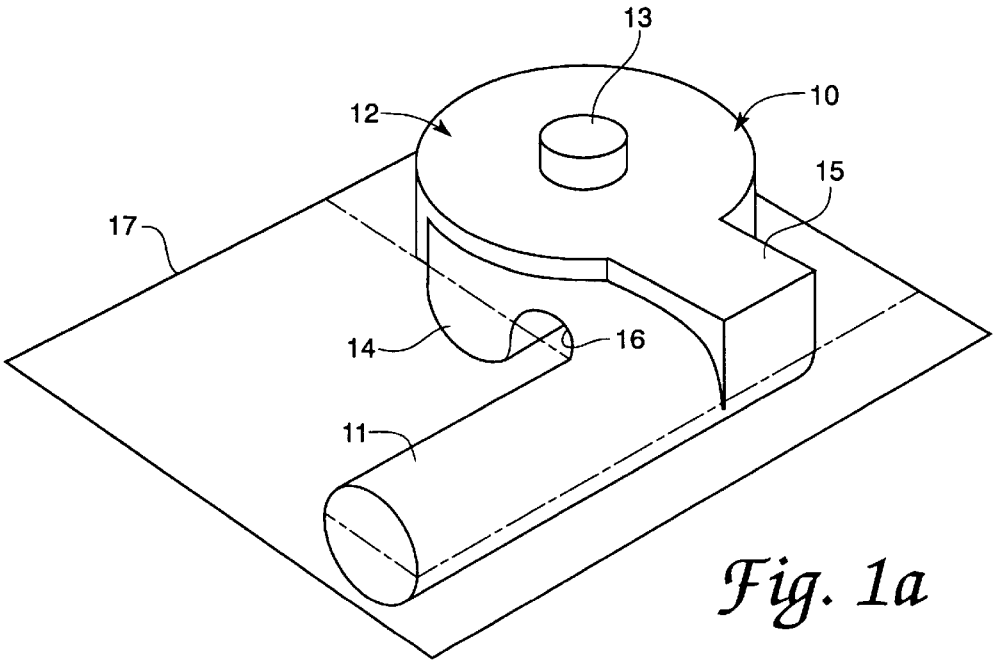
FIGS. 1*a–e* show in a comprehensive fashion the foundry casting mold fabrication method of the invention with relation to a representative three dimensional part and associated parting surface, cores, core boxes and rigging which are defined in the practice of the invention.
Figure 1B:
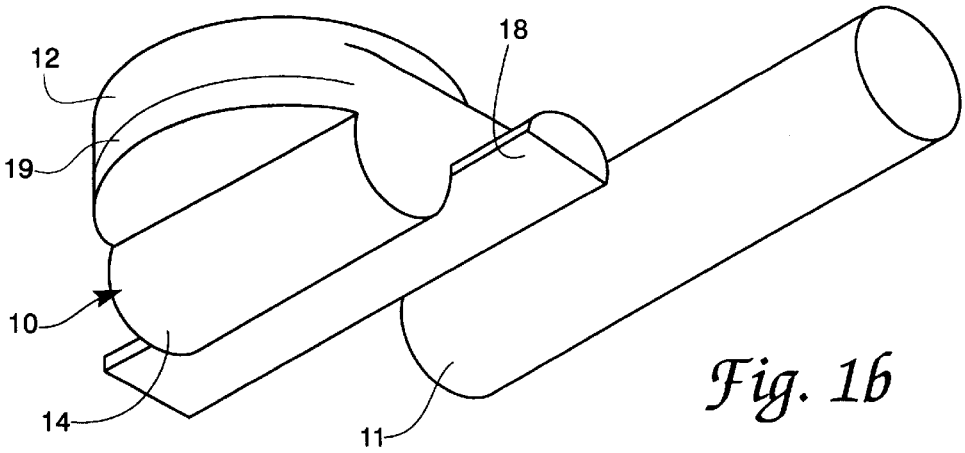
Figure 1C:
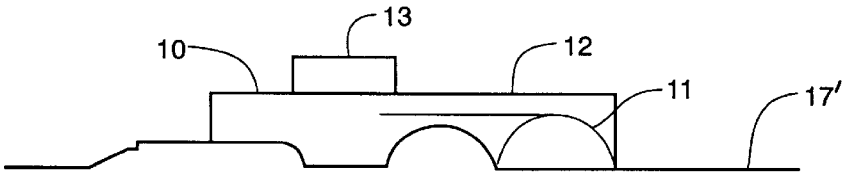
Figure 1D:
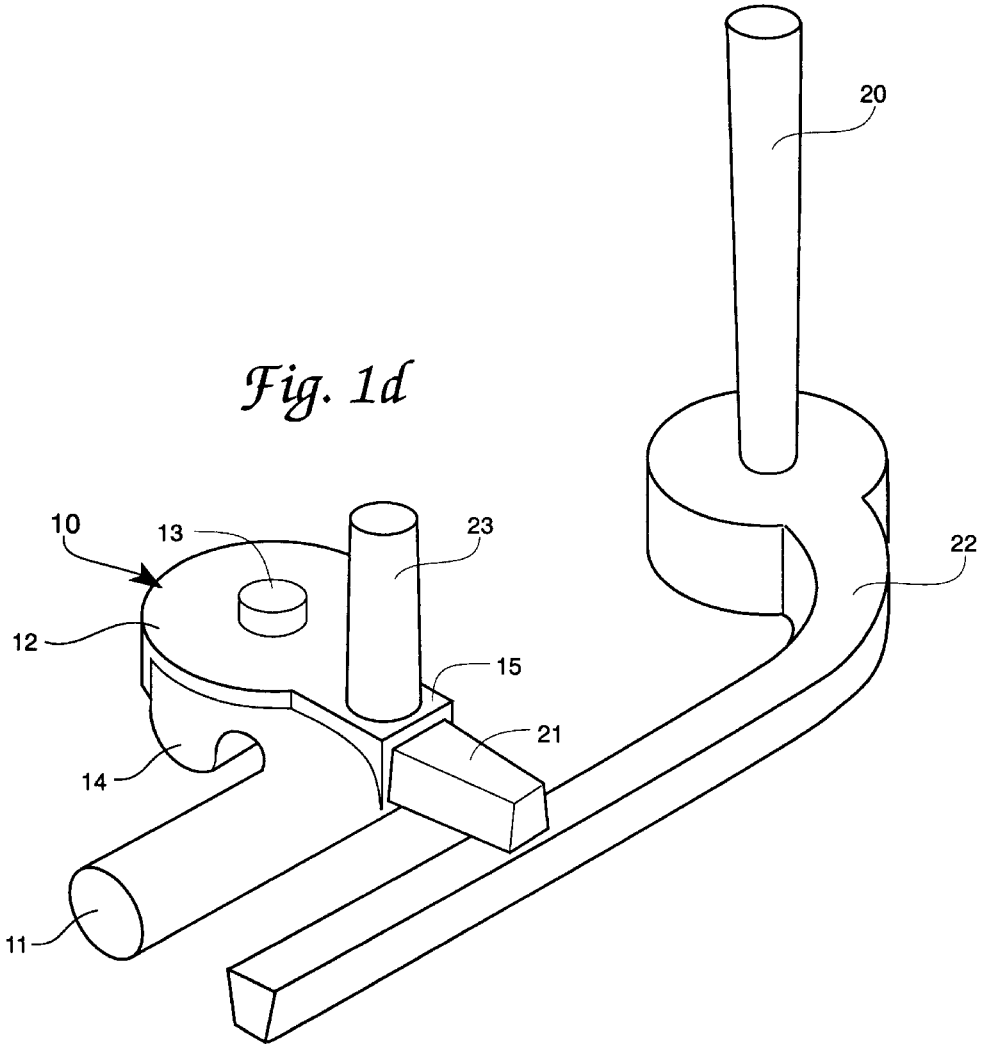
Figure 1E:
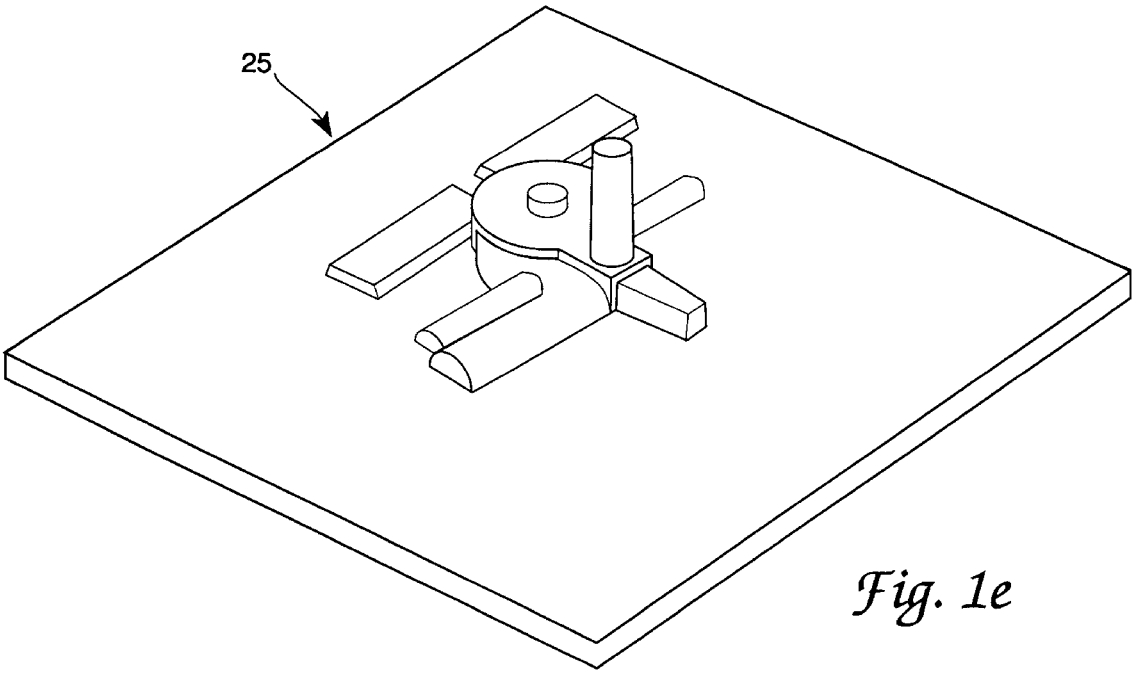

Referring now to the drawings, FIGs 1*a–e* show in comprehensive fashion an overview of the rapid foundry tooling system and fabrication method of the invention with reference to a representative complex three dimensional part 10 intended to be cast. In accordance with a principle feature of the invention, a plurality of shape features (in selected sizes and locations), including bosses, disks, slots, shafts, blends and other simple shapes are used to define the structure of part 10. Therefore, part 10 may be defined by cylinder 11, disk 12, boss 13, (half) cylinder 14, block 15 and slot 16. The structure of part 10 is first defined based on data representing size and shape of each consitituent feature entered into a CAD system. The structure of part 10, having been defined in terms of CAD system data, may then be displayed in any representative view on the CAD system display. Once the structure of part 10 is defined as just described, an initial parting surface 17 for casting part 10 is then selected, and the associated sprues, runners, gates, risers, cores, core boxes and mold are then iteratively generated in order to optimize the design of the resultant pattern, pattern board and mold. For example, with reference to FIG. 1*b* showing part 10 from below, the initial parting surface 17 indicated in FIG. 1*a* suggests volumes 18 and 19 of specified shapes as requiring cores in corresponding shapes and locations in a pattern for part 10. However, with reference to FIG. 1*c*, identification of volumes 18 and 19 in FIG. 1*b* indicate an appropriate new parting surface 17' (with parting surface offsets) which eliminate the necessity of cores for volumes 18,19. The automatic identification and generation of an appropriate offset parting surface 17', or other parting surface which results in minimum quantity and complexity of cores, is a critical feature of the invention. Once the offset parting line is generated, the invention specifies location of the appropriate rigging (sprues 20, gates 21, runners 22 and risers 23) for casting part 10 such as illustrated in FIG. 1*d*. Once the rigging for part 10 is specified, pattern board 25 (FIG. 1*e*) and mold configuration are automatically generated.

Figure 2:
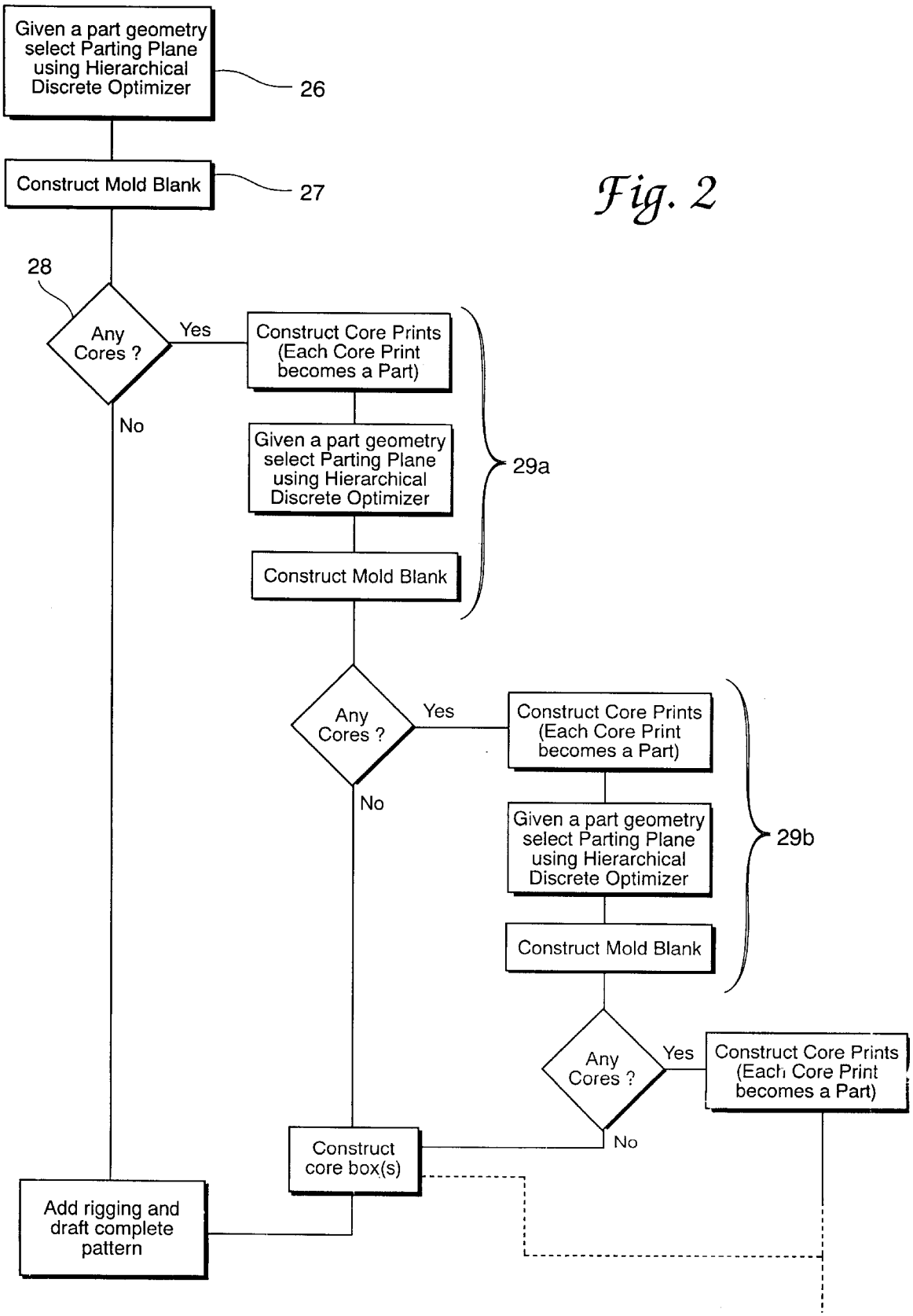
FIG. 2 is a block diagram of the steps of the method for constructing a mold pattern according to the invention.

Referring now to FIG. 2, shown therein is a block diagram of the method steps for constructing a mold pattern according to the invention. The listing of a representative computer program useful in executing the algorithm for constructing the mold pattern, including identification of required cores, in the practice of the method of the invention, and used in demonstration of the invention, is presented in Appendix A hereto. As suggested in FIG. 2, and with reference to the computer listing in Appendix A, the geometry of the part to be cast is first identified and defined in terms of CAD) system data, and an appropriate parting surface for optimum orientation of the part within the mold is generated as at 26. (See Computer Graphics Handbook Geometry and Mathematics, by Michael E. Morrison, Industrial Press Inc. (1990), the entire teachings of which are incorporated by reference, particularly Part 10, "Transformations".) Geometry of the part to be cast may be defined in terms of any suitable CAD data system as would occur to the skilled artisan guided by these teachings, the software used to define the geometry of parts in demonstration of the invention being SHAPES (Release 1.5, XOX, Inc., Minneapolis MN (1995)), and is incorporated by reference herein.

Two solids, called mold blanks, which represent the volume of the mold on the upper (cope) side and lower (drag) side of the parting surface, are generated as at 27. Core requirements 28 for the mold blank defined with respect to the parting surface are then identified. Each positive feature of the part is swept to the parting surface and the part is subtracted from the projection, and any remaining volume is added to the core. Negative features are swept away from the parting surface to the top or bottom of the mold and subtracted from the projection, the remainder is intersected with the part; and any remaining volume is added to the core. Once core requirements, if any, are identified for the selected parting surface, optional new parting surfaces are successively generated at each combination of two or more vertices defining a unique new plane through the part. The optimum parting surface is selected by considering the number and complexity of the core requirements and the number of surfaces of the part to be drafted for each parting surface so generated and considered.

As core requirements are identified for the optimum parting surface, the geometry of each core print (a separate part corresponding to the configuration of the associated core volume) is defined, and the core box for molding each defined core print is defined according to the recursive parting surface selection and core identification procedure just described for the original part to be cast including successive identification of any core requirements for each identified core as suggested at 29*a* in FIG. 2. For each core requirement, the core pattern, called a core print, is constructed by sweeping any vertical faces not flush with the part away from the body of the core piece. Distance of sweep is selected as one half the core depth in a direction normal to the surface being swept. If faces on opposite sides of the core are not being swept, the distance of sweep is selected equal to the depth of the core normal to the face being swept. These sweep distances are needed to maintain rigid positioning of the core print during metal pouring.

When all core requirements for the part (including core requirements for each core print) are identified and the corresponding core prints are defined by recursively defining as at 29*b* any required core prints (i.e. second or higher order core prints) for any cores defined at 29*a*, the pattern for the casting is defined by adding all the identified core prints to the part, adding draft to the pattern surfaces, and adding the appropriate rigging such as suggested for the example of FIG. 1*d*.

Figure 3A:
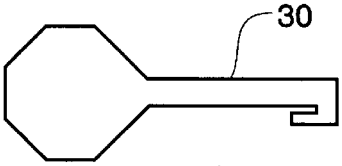
FIGS. 3*a–g* show the method of the invention by reference to a two-dimensional example.
Figure 3B:
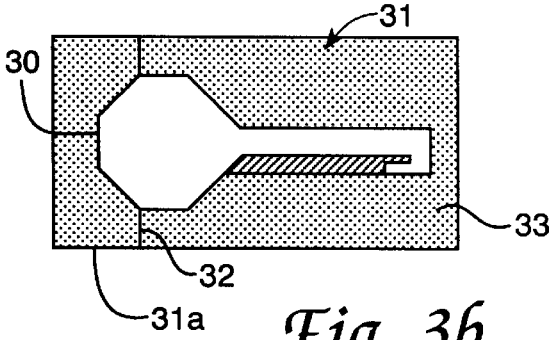
Figure 3E:
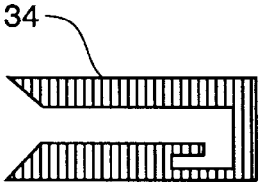
Figure 3C:
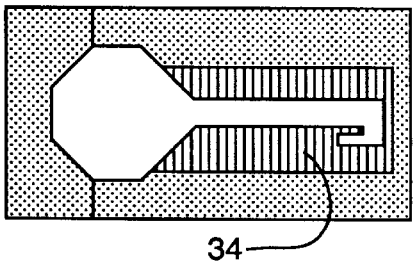
Figure 3F:
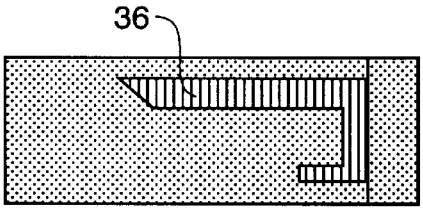
Figure 3D:
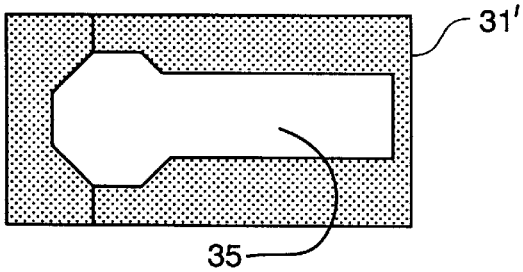
Figure 3G:
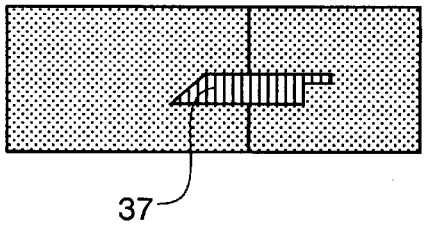

The hierarchical procedure for optimizing pattern construction according to the foregoing may be illustrated by reference to the two-dimensional example of FIGS. 3*a–g* . Consider the hook shaped member 30 to be cast which must be removed from the mold in a lateral direction in the plane of FIGS. 3*a–g* . First, a suitable parting surface 32 is defined (FIG. 3*b*). Parting surface 32 defines how the pattern will be oriented with respect to the mold, i.e., the pattern will be withdrawn from the two mold 31 portions 31*a*,33 perpendicularly to parting surface 32. Because of the complexity of mernber 30, namely the hook feature, the pattern cannot be removed from mold 31 without destroying mold portion 33. The volume where a core 34 will be used is therefore identified by cloaking that portion of the pattern which cannot be withdrawn from mold 31 with a core print of suitably simple geometry, such as a prismatic solid, to define an augmented pattern 35 which can be withdrawn without destroying the mold. Mold 31' formed to augment pattern 35 is called the first-level mold, and a core which will be inserted into mold 31' is called the first-level core (see FIG. 2 at 29*a*). Subtracting member 30 from core 34 volume defines core 34 (FIG. 3*e*) which must be cast each time a mold is made. The core box for casting the first-level core print is then fabricated. This mold is called the second-level mold. One second-level mold is required for each first-level core piece. In addition, some first-level cores are of such complexity as to also require cores, called second-level cores in the recursive procedure described herein (see FIG. 2 at 29*b*). Second-level molds and secondlevel cores may be constructed of suitable material to be reusable. Core 34 geometry may prevent its casting in a simple mold, and core 34 must therefore be cast in multiple (2 for core 34) pieces 36,37 to be cast properly (FIGS. 3*f,g*). Core pieces 36,37 may be connected in mold 31' as by positioning pins (not shown).

Figure 4:
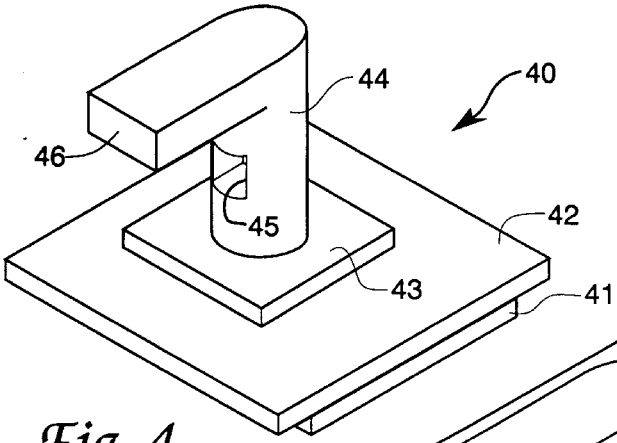
FIG. 4 shows a perspective view of another example casting having complex features for illustrating the method of the invention.
Figure 5:
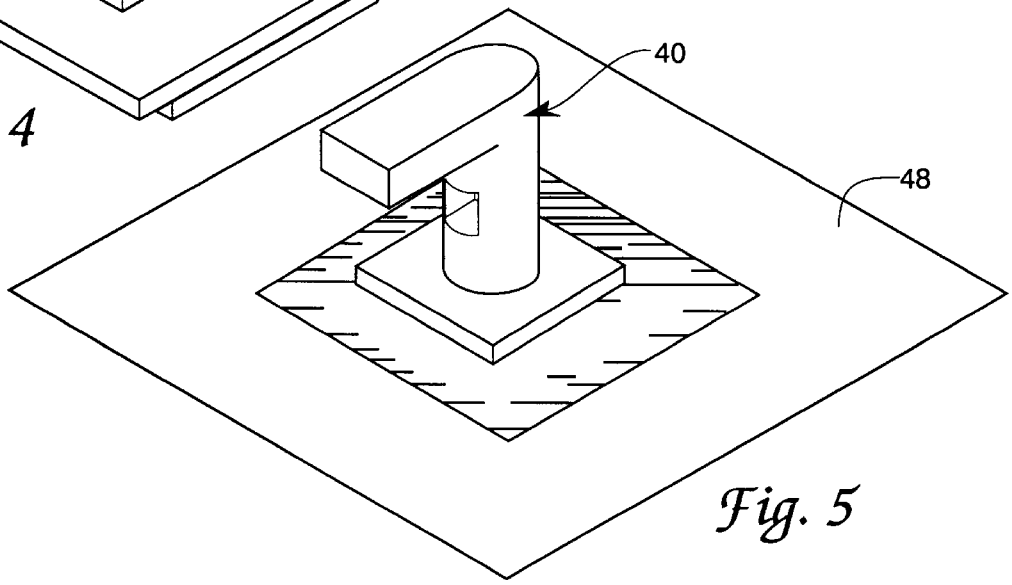
FIG. 5 shows the location of a first parting surface which is automatically generated by the method of the invention for the FIG. 4 casting.

Referring now to FIGS. 4–29, shown therein are the steps defining the optimized recursive foundry tooling procedure outlined above and set out in the computer program listing of Appendix A in relation to a complex part to be cast. FIG. 4 depicts in perspective example part 40 to be cast in the recursive procedure. Example part 40 is first defined in terms of CAD system data as described above and has a base comprising an assemblage of a plurality of various sized plate members 41,42, 43, upright cylindrical member 44, and a cavity 45 in cylindrical member 44 and cantilevered section 46 which renders the design of a pattern for making sand molds for part 40 a non-trivial procedure. FIG. 5 shows part 40 with one parting surface 48 generated at the upper surface of plate member 42 by the optimized recursive procedure of the invention. As suggested above in relation to FIG. 2, a plurality of parting surfaces may be generated for part 40, depending on its shape, as at any surface of the plate members 41,42,43, but for clarity, discussion of the procedure related to part 40 will begin with reference to parting surface 48 illustrated in FIG. 5. It is noted, however, that for example part 40 the recursive procedure of the invention favors parting surfaces which are defined by the surfaces of plate members 41,42,43. This constraint corresponds to the general objective of pattern-makers to have the majority of the volume of the casting in the lower half of the mold for optimum solidification of molten material. For clarity of the example, part 40 is shown in an orientation in the mold which is inverted to that which would normally be utilized.

Figure 6:
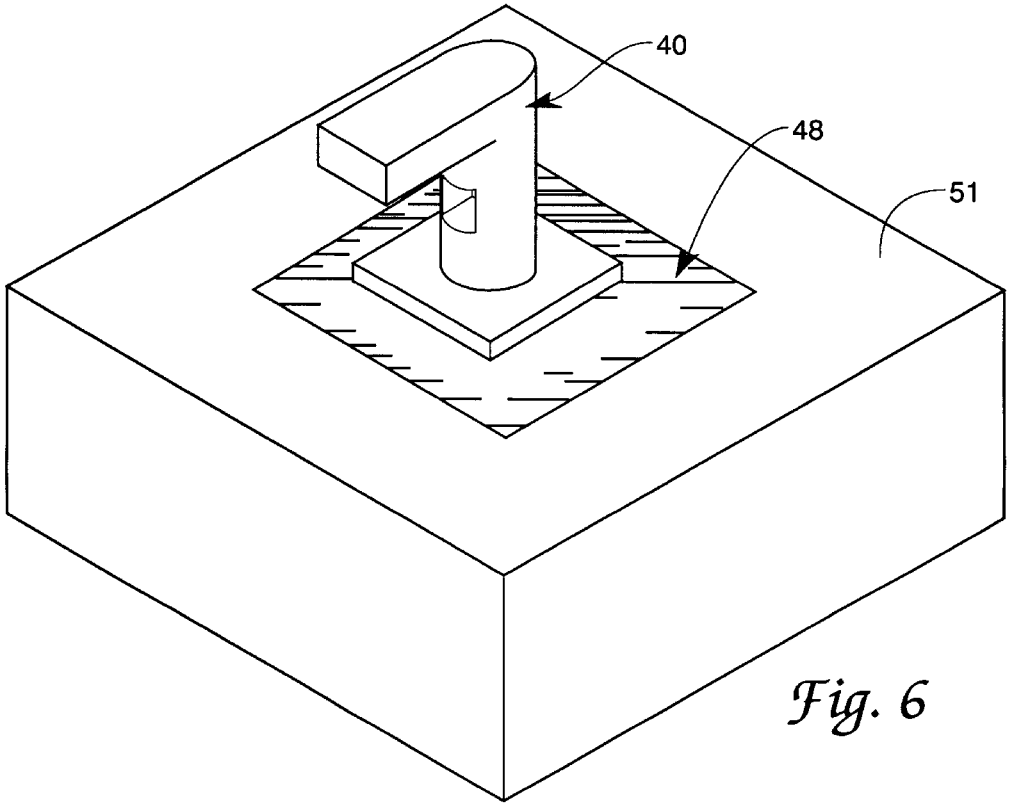
FIG. 6 shows the FIG. 4 casting as it would appear in the lower (drag) portion of the mold for the generated parting surface illustrated in FIG. 5.
Figure 7:
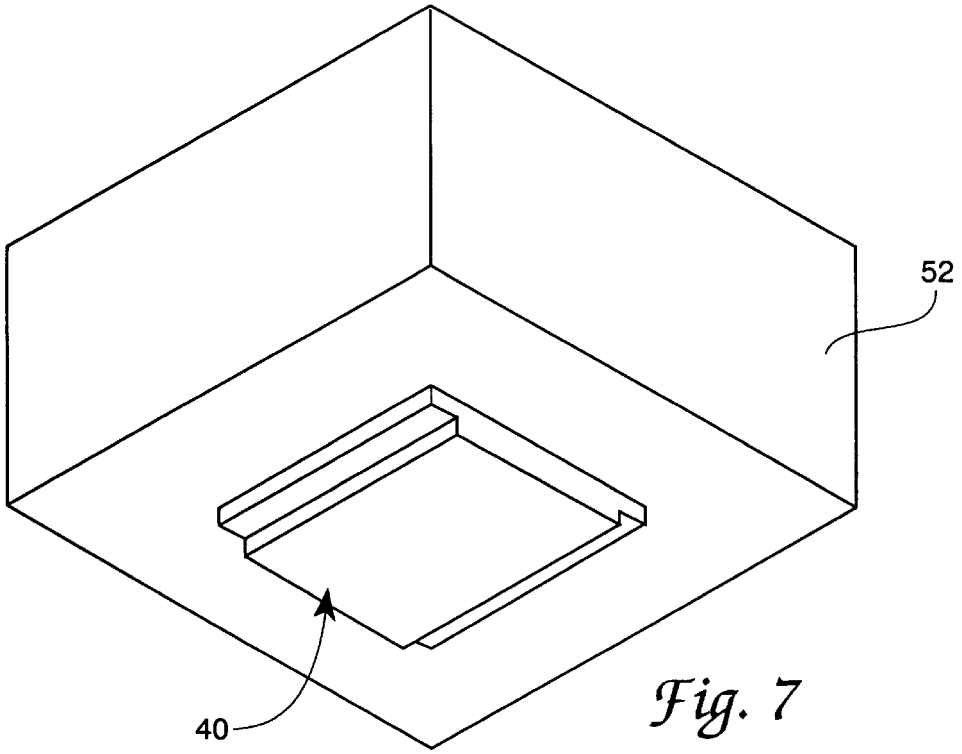
FIG. 7 shows the FIG. 4 casting in a view from below as it would appear in the upper (cope) portion of the mold for the generated parting surface illustrated in FIG. 5.
Figure 8:
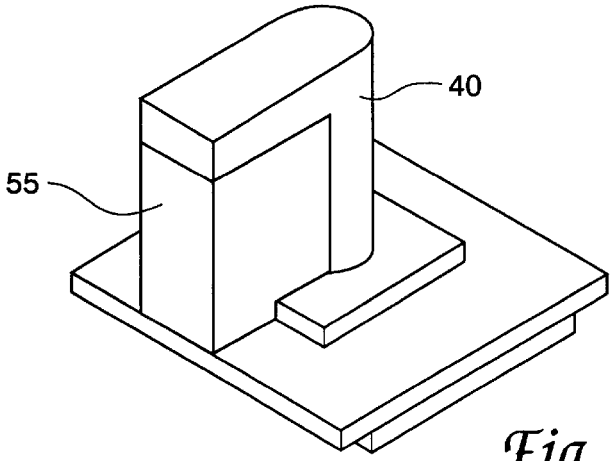
FIG. 8 shows the identification of the volume of the mold, for the FIG. 4 casting and the FIG. 5 parting surface, in which a core is required.
Figure 9:
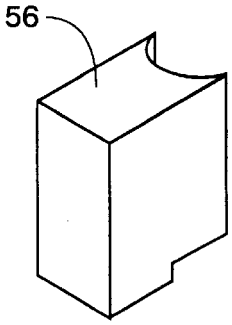
FIG. 9 shows in isolation the core requirement identified in relation to FIG. 8.
Figure 10:
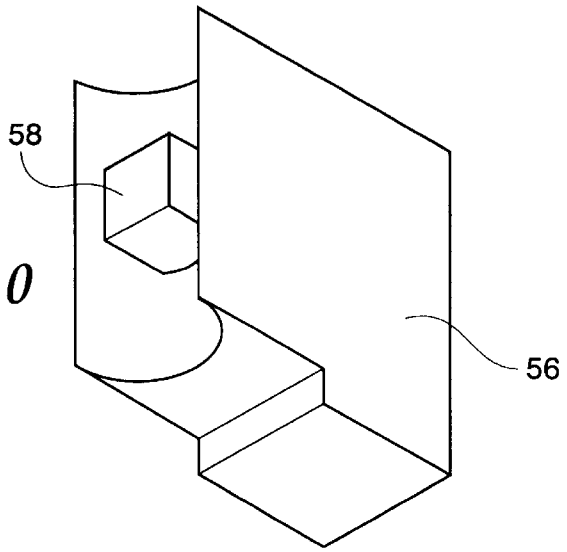
FIG. 10 shows the FIG. 9 core requirement as viewed from below at a reverse angle.

Referring now to FIG. 6, shown therein is part 40 as its casting would appear in the lower (drag) portion 51 of the mold for the generated parting surface 48 of FIG. 5. FIG. 7 shows the casting of part 40 as it would appear in the upper (cope) portion 52 of the mold for the same parting surface 48. As suggested above in relation to FIG. 2 and the program listing of Appendix A, once the structure of part 40 is defined and parting surface 48 is selected, volume 55 of the mold in which a core is required (core requirement) is identified as depicted in FIG. 8. FIG. 9 shows in isolation the core 56 requirement identified in relation to FIG. 8, and FIG. 10 shows the core 56 requirement viewed from below. In the FIG. 10 view, tab 58 corresponding to cavity 45 in cylindrical member 44 of part 40 is revealed.

Figure 11:
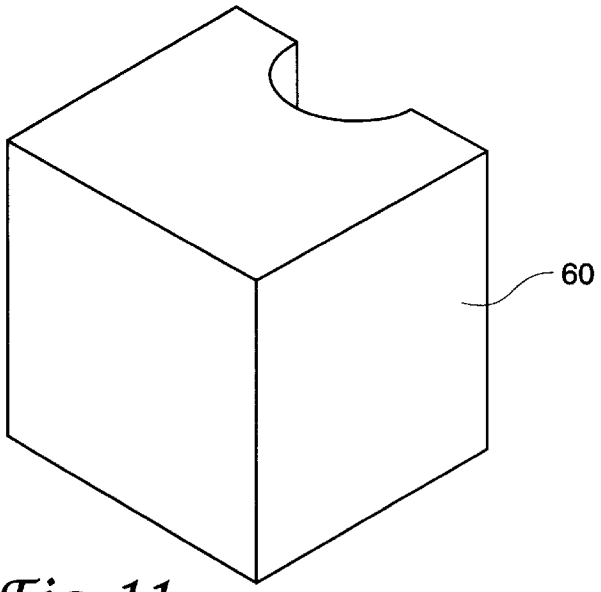
FIG. 11 shows in isolation the FIG. 9 core requirement with core prints added to the core requirement to make up the finished core.
Figure 12:
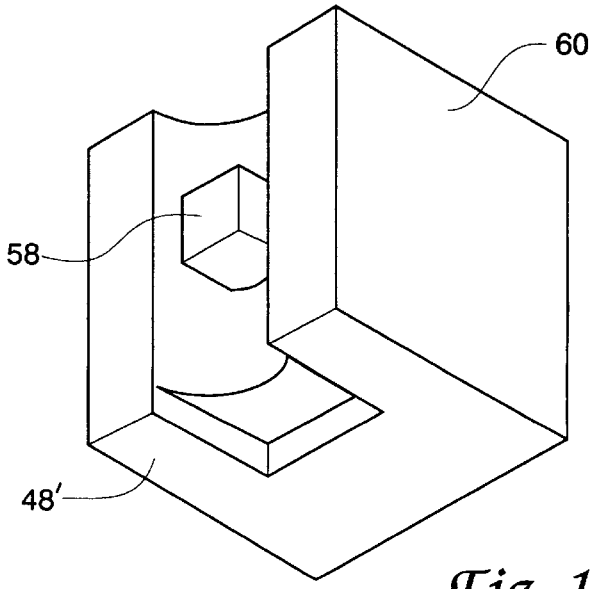
FIG. 12 shows the finished core of FIG. 11 as viewed from below at a reverse angle.

Because the core 56 requirement identified in FIG. 8 itself does not constitute the entire core which the foundryman would insert into the mold, structures must be added to the core requirement which allow it to be mounted securely inside the mold. These structures, called core prints, are generated as described above and are added to the core requirement to make up finished core 60, as shown in FIG. 11, and are added to the pattern to create the cavities in the mold in which core 60 is mounted. As such, the core prints must also be removable from the mold. The recursive procedure of the invention automatically adds correct core prints to a core requirement to complete the core design. In FIG. 11, core prints are shown added to the sides of the core and comprise structures which are not merely extensions of the exposed sides of the core, but extend to parting surface 48 to ensure proper positioning of the core print within the mold. FIG. 12 shows the finished core 60 of FIG. 11 as viewed from below at a reverse angle. The extension of the core prints to parting surface 48 is illustrated. If the prints were only extensions of the exposed surfaces of the core requirement then a volume of the mold would be trapped between the core prints and the large plate member 42 of the casting defining part 40.

Figure 13:
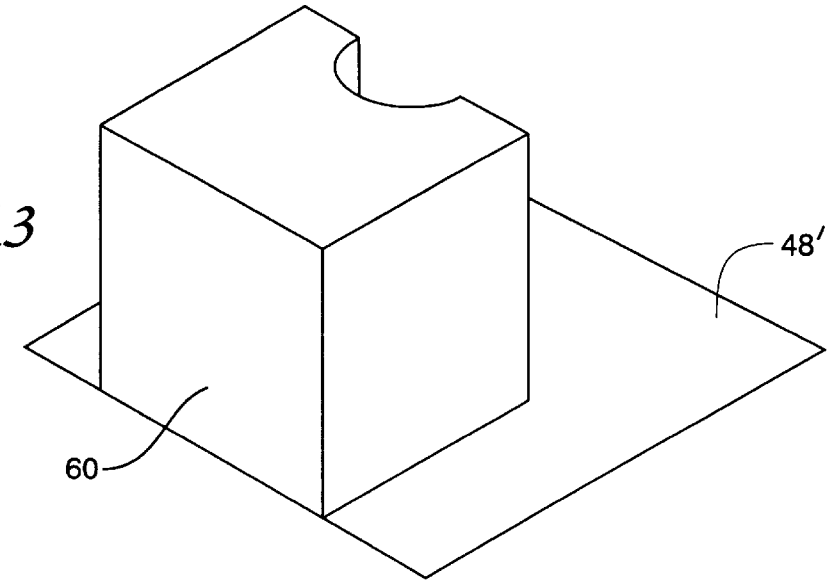
FIG. 13 shows the location a parting line as generated by the method of the invention for the finished core of FIG. 11.
Figure 14:
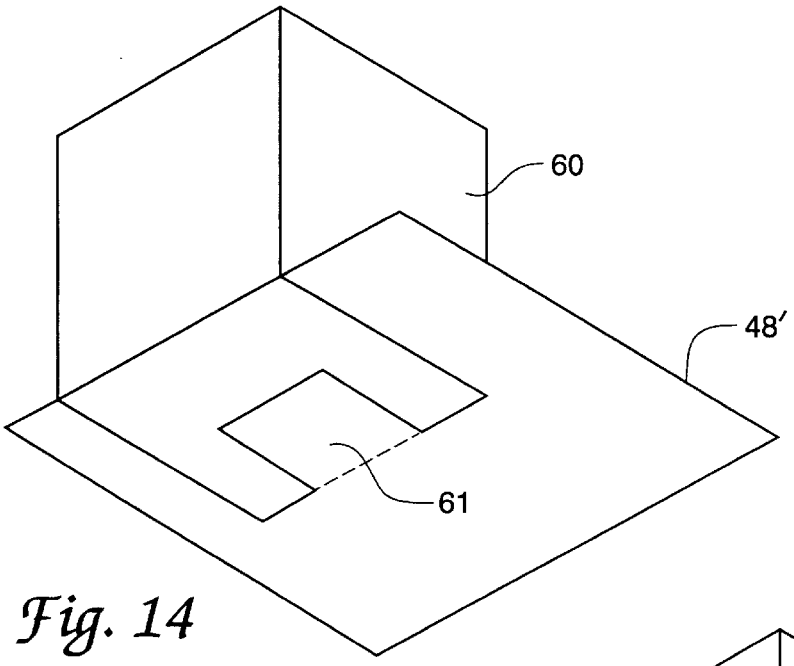
FIG. 14 shows from below the finished FIG. 11 core with the parting line illustrated in FIG. 13.
Figure 15:
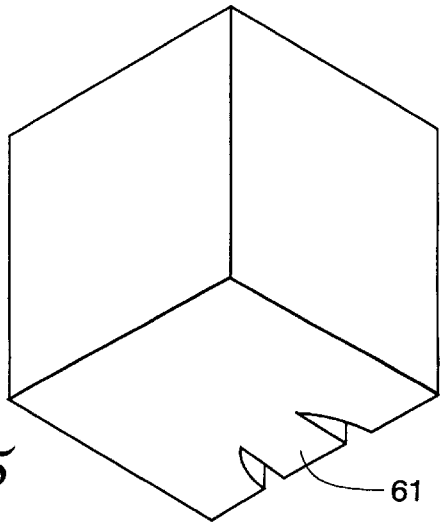
FIG. 15 shows the loose piece requirement for the FIG. 11 core.
Figure 16:
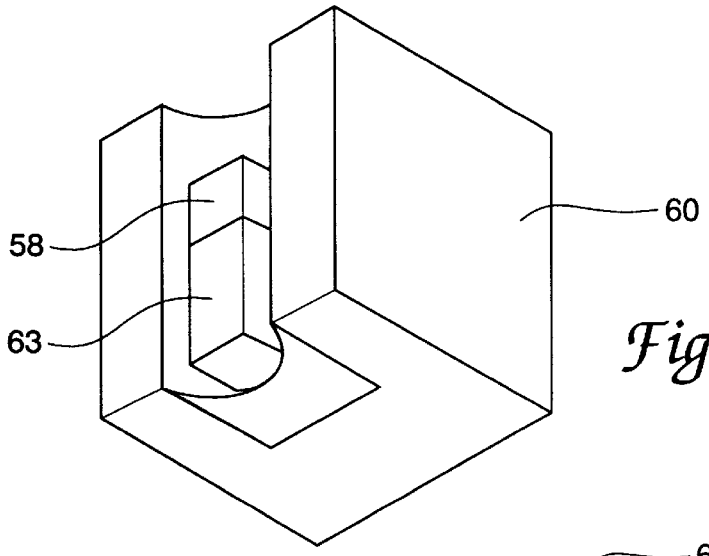
FIG. 16 shows the loose piece requirement identified in FIG. 15 as viewed from below at a reverse angle.

Because all cores must be constructed each time a new part is cast, the most efficient way to construct cores is by molding in permanent molds called coreboxes. Coreboxes, like molds for the casting, must be constructed so that the core can be removed from the corebox in a nondestructive manner. The recursive procedure of the invention efficiently designs the structure for the coreboxes for all cores using the same procedure as that used to construct the mold of the casting. Specifically, the recursive procedure of the invention generates the appropriate parting surfaces for the core, and, for each generated parting surface, identifies any trapped volumes in the corebox (called loose piece requirements rather than core requirements for clarity), and specifies the structure of the corresponding coreboxes. FIG. 13 shows parting surface 48' for the FIG. 11 core 60 which is generated by tie procedure and which is flush to the bottom of core 60. FIG. 14 shows core 60 and parting surface 48' from below, and reveals trapped volume 61 between parting surface 48' and core 60. The geometry of trapped volume 61 between core 60 and parting line 48', seen in FIG. 15, is then defined in order to identify a corresponding loose piece requirement for core 60. FIG. 16 shows the loose piece 63 requirement in a view reverse of FIG. 15.

Figure 17:
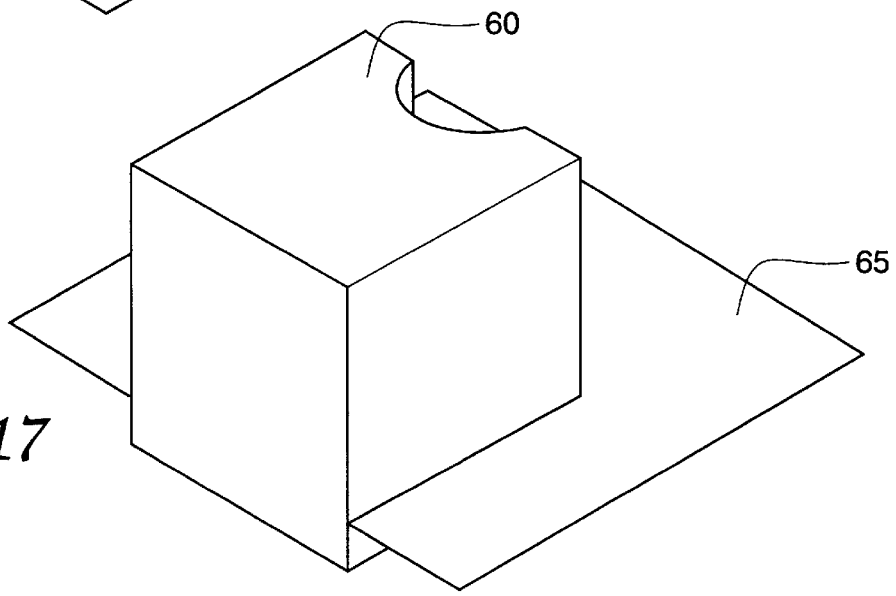
FIG. 17 shows the finished FIG. 11 core with the location of an alternative parting surface as generated by the method of the invention.
Figure 18:
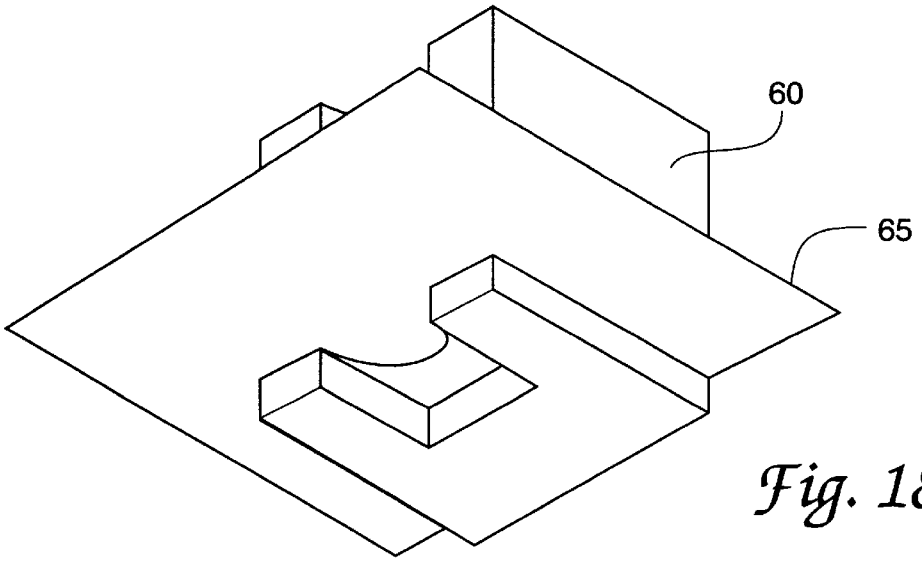
FIG. 18 is a view from below at a reverse angle of the finished FIG. 11 core with the alternative parting line illustrated in FIG. 17.
Figure 19:
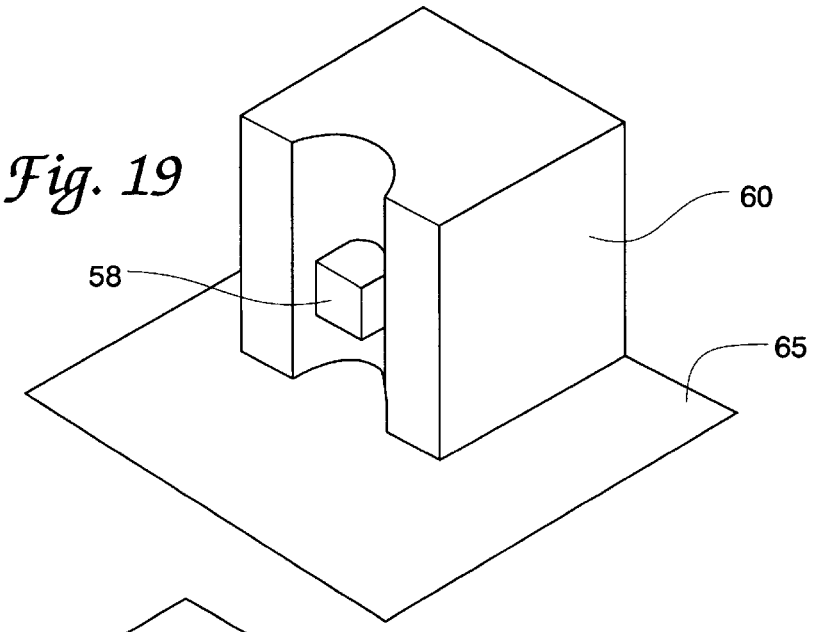
FIG. 19 is a view of the FIG. 11 core and alternative parting surface reverse of the FIG. 17 view.

Because the existence of a loose piece 63 requirement identified in relation to parting surface 48' generated as shown in FIG. 13 may not be the optimum configuration for the finished pattern, the recursive nature of the procedure generates second and successive parting surfaces and identifies the associated core and loose piece requirements in order to arrive at the optimum configuration (FIG. 2 at 27). FIGS. 17 and 18 are respective views from the top and bottom of the FIG. 11 core 60 with an alternative parting surface 65. Note that, in accordance with the general scheme of the algorithm of the invention to generate parting surfaces at vertices of the part geometry, the alternative parting surface is flush with the top of the impression in the core corresponding to the smaller plate member 43 of part 40. FIG. 19 is a view reverse of the view of FIG. 17 showing core 60 and alternative parting surface 65, and reveals trapped volume 67 between tab 58 on core 60 and alternative parting surface 65. Trapped volume 67 identified in FIG. 19 then defines the geometry of a loose piece requirement associated with alternative parting surface 65.

Figure 20:
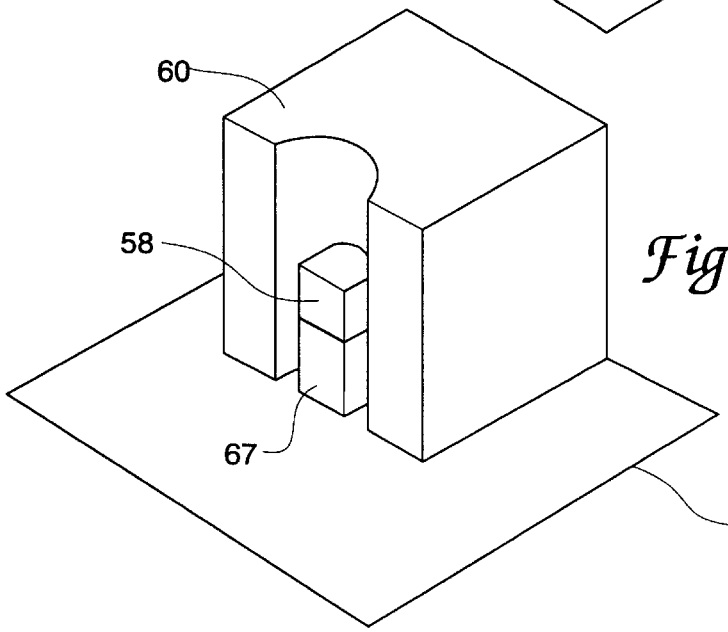
FIG. 20 shows the loose piece requirement for the finished FIG. 11 core with the alternative parting surface location.
Figure 21:
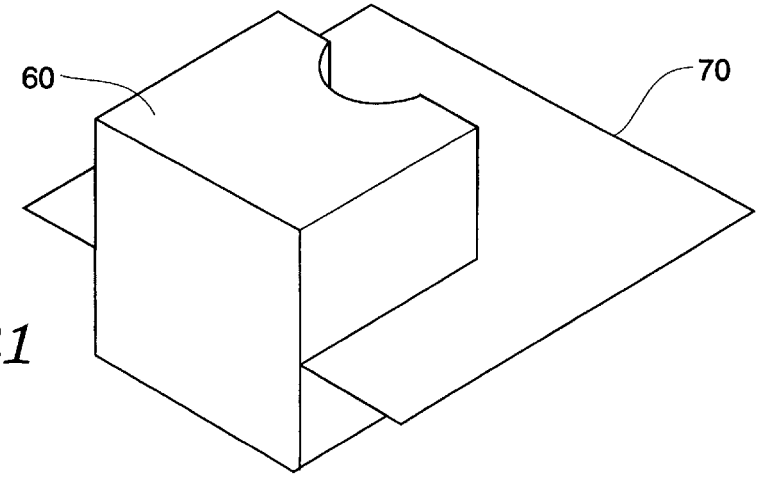
FIG. 21 shows the finished FIG. 11 core with the location of a second alternative parting surface generated by the method of the invention.
Figure 22:
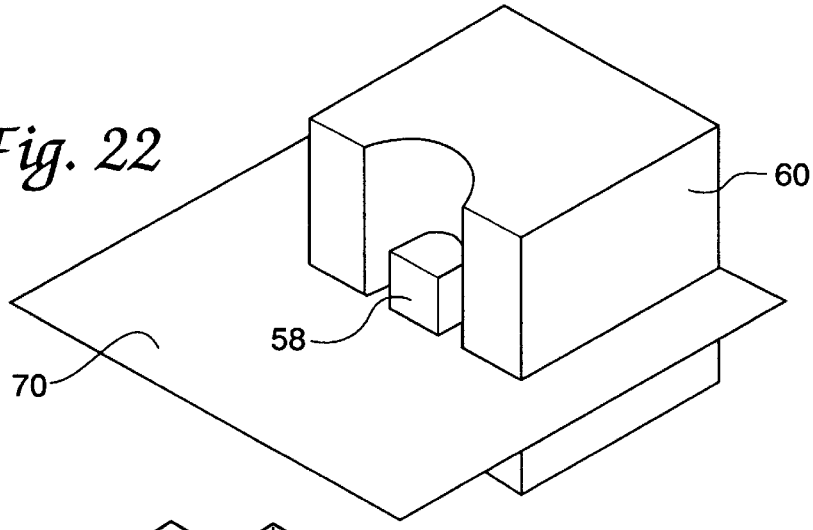
FIG. 22 is a view from a reverse angle of the finished FIG. 11 core with the second alternative parting surface illustrated in FIG. 19.
Figure 23:
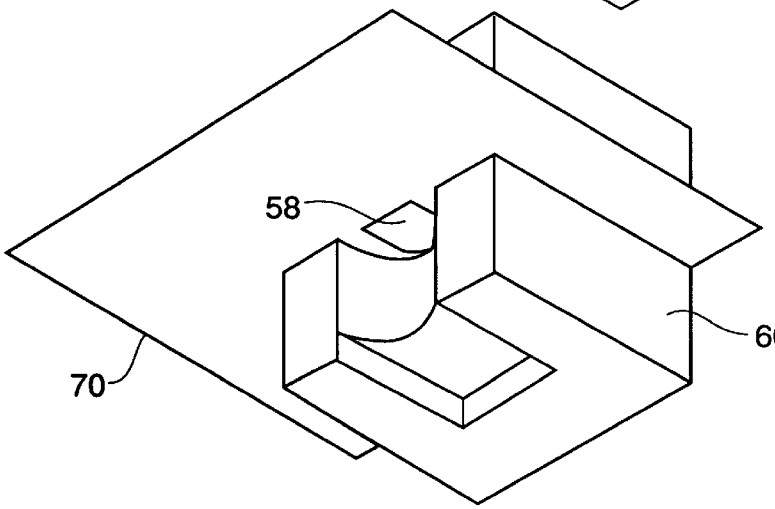
FIG. 23 is a view from below at a reverse angle of the finished FIG. 11 core with the second alternative parting line of FIG. 19.

In a manner like that for generation of first alternative parting surface 65, because of the identification of a loose piece requirement for trapped volume 67 of FIG. 20, the procedure of the invention recursively generates second parting surface 70 such as shown in FIGS. 21,22,23. Second alternative parting surface 70 is flush with the bottom of tab 58 which corresponds to cavity 45 in cylindrical mem-ber 44 of part 40 (FIG. 4). It is noted that no trapped volume exists between any portion of core 60 and second alternative parting line 70, so that the procedure of the invention has successfully identified a parting surface 70 and associated core requirements for which no loose piece is required.

Figure 24:
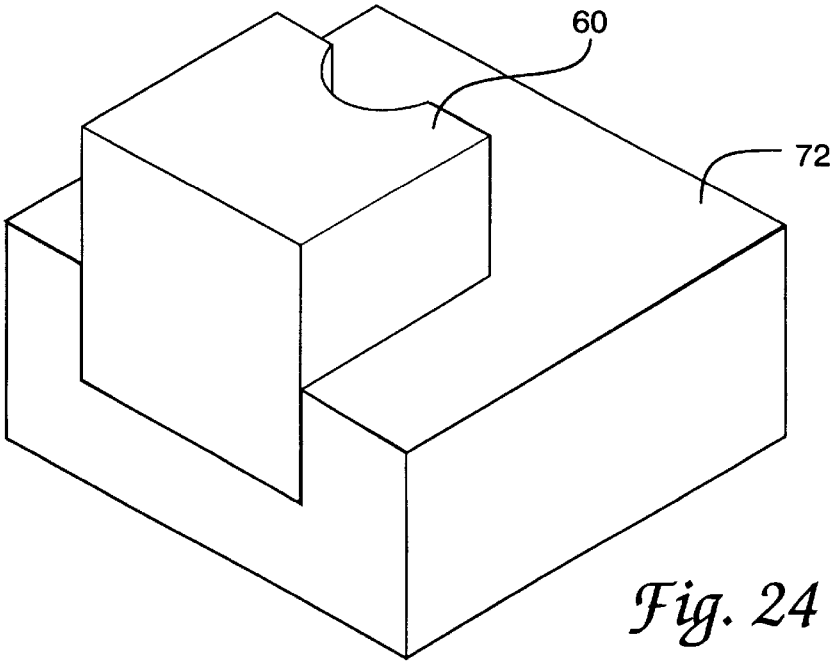
FIG. 24 shows the FIG. 11 core with the lower half of the associated corebox for the second alternative parting surface illustrated in FIG. 19.
Figure 25:
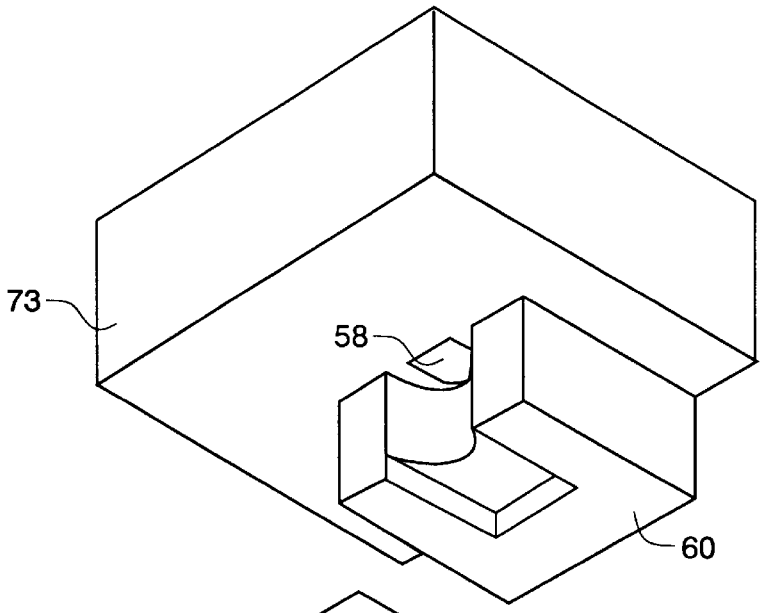
FIG. 25 shows the FIG. 11 core with the upper half of the associated corebox and second alternative parting surface as viewed from below and at an angle reverse of the FIG. 24 view.
Figure 26:
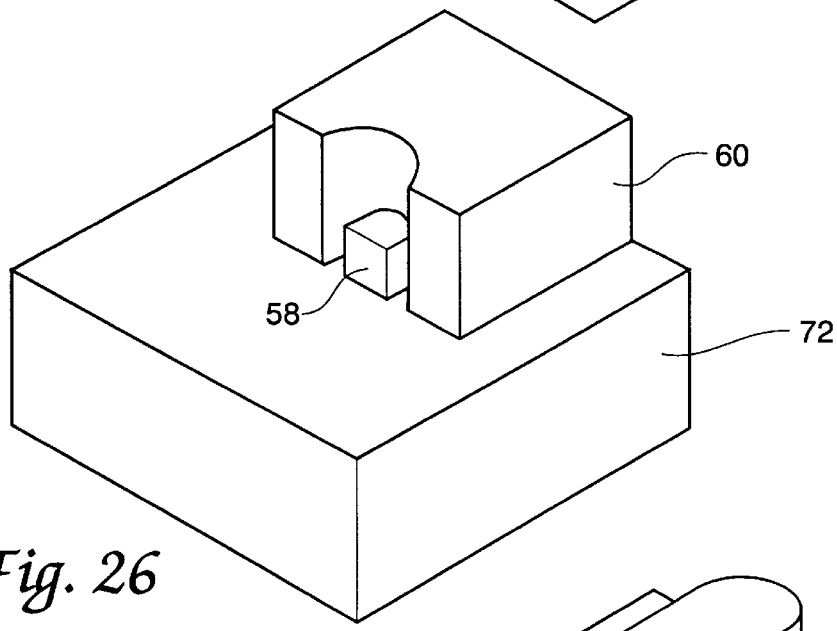
FIG. 26 shows the FIG. 11 core and lower corebox half as viewed at an angle reverse of the FIG. 24 view.

Having identified optimum parting surface 70 for core 60, the associated core box for casting the core is constructed from two rectangular prisms, one on each side of the parting surface. FIGs 24 and 26 show two views of core 60 and lower portion 72 of the corebox, and FIG. 25 shows core 60 and upper portion 73 of the corebox.

Figure 27:
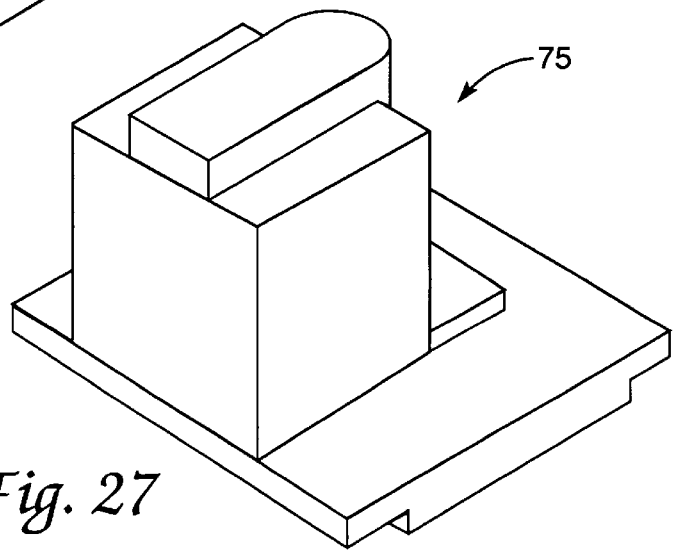
FIG. 27 shows the finished pattern used to make the sand mold for the FIG. 4 casting and all the coreboxes required to make the cores for the mold.
Figure 28:
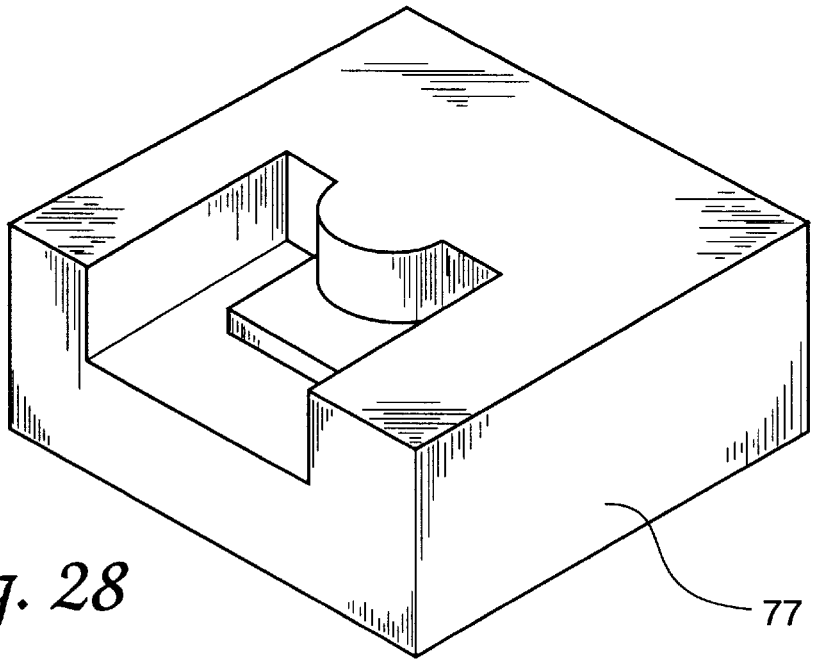
FIG. 28 shows the lower half of the corebox required for the FIG. 27 pattern.
Figure 29:
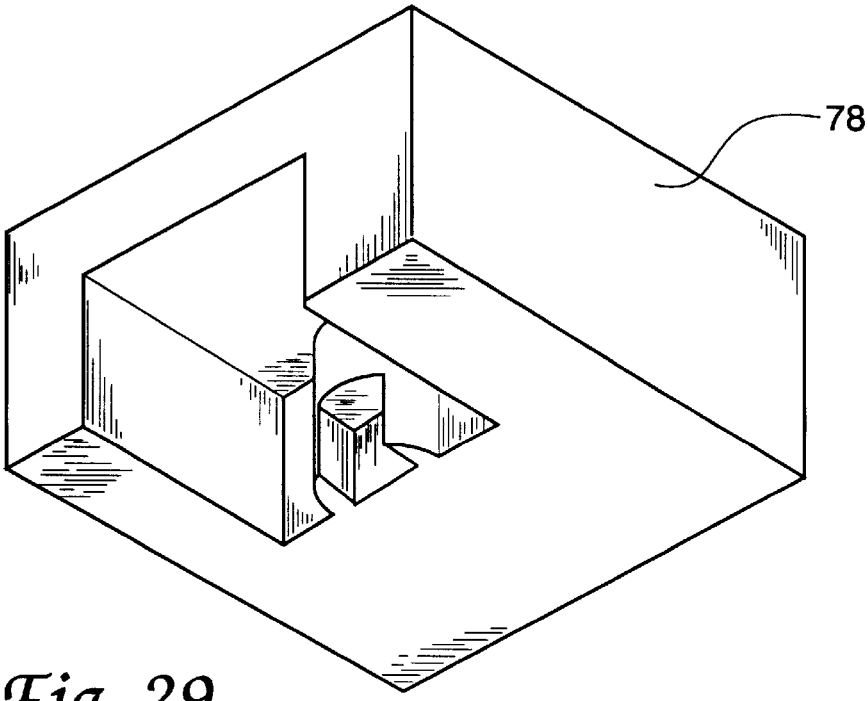
FIG. 29 shows from below the upper half of the corebox required for the FIG. 27 pattern.

Once the core and loose piece requirements are identified and defined, the finished pattern 75 is needed to make the sand mold for casting part 40 and all the coreboxes required to make the cores for the mold comprise the parts required to make sand molds of the casting. The finished pattern is constructed by adding the core prints to the part pattern. FIG. 27 shows final pattern 75 for casting part 40 with the features (rigging) used to convey metal into the mold and reservoirs for holding the metal being omitted for clarity. FIGS. 28 and 29 show respective lower and upper portions 77,78 of the corebox for the core (FIG. 11).

The permanent components used in the recursive molding process of the invention may be fabricated using virtual reality based rapid prototyping technology, such as stereolithography, and feature-based CAD solid modelling software and associative memory.

The invention therefore provides a novel method for efficiently producing a metal casting mold for a complex part. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

Appendix A: Page 1

```
(in-package 'ws)

;;;
;;; this function reads the orientation formula from the
;;; "orient-editor" icon.
;;;
(defun cad-get-orientation-formula ()
  (read-from-string
   (eam-cat-strings
    (apply #'eam-cat-strings (read-icon-value 'orient-editor 'edit))
    ")")))


;;;
;;; this function inverts the orientation formula in the
;;; "orient-editor" icon by appending a rotation about the x-axis of
;;; the part by 180.0. this works because the main-parting-plane
;;; lies in its local x-y plane.
;;;
(defun cad-invert-orientation-formula ()
  (read-from-string
   (eam-cat-strings
    (apply #'eam-cat-strings (read-icon-value 'orient-editor 'edit))
    "(rotate about the :x-axis of (the) by 180.0)"
    ")")))


;;;;;;
;;;;;;;;; returns positive features
;;;;;;;;; attached to the part-model including the
;;;;;;;;; starting block.
(defun cad-get-positive-features ()
  (delete nil (mapcar #'(lambda (feature)
                                (if (posp feature)
                                    feature))
                          (select :use (the eam-space part-model) :type 'fbde-feature-mixin))
              :test #'equal))


;;;;;;
;;;;;;;;; returns negative features
;;;;;;;;; attached to the part-model
(defun cad-get-negative-features ()
  (delete nil
              (mapcar #'(lambda (feature)
                          (if (not (posp feature))
                                feature))
                        (select :use (the eam-space part-model) :type 'fbde-feature-mixin))
              :test #'equal))


;;;;;;
;;;;;;;;; returns negative features
;;;;;;;;; attached to the part-model
(defun cad-get-transition-features ()
  (delete nil
              (mapcar #'(lambda (feature)
                          (if (or (feature-classp feature 'fillet-feature)
                                  (feature-classp feature 'radius-feature))
                              feature))
                        (select :use (the eam-space part-model) :type 'fbde-feature-mixin))
              :test #'equal))


(defun cad-get-xox-blend-features ()
  (delete nil
              (mapcar #'(lambda (feature)
                          (if (or (feature-classp feature 'fillet-feature)
                                  (feature-classp feature 'radius-feature))
                              (if (the use-blends-toolkit (:from feature))
```

```
                                feature)))
                        (select :use (the eam-space part-model) :type 'fbde-feature-mixin))
            :test #'equal))


;;;
;;; Returns the list of 3D coordinates of the 0D sub-geoms of a geom.
;;;
(defun cad-get-face-points
 (face-geom
  &aux
  (final-list nil)
  found-list)
 (setf found-list (mapcar #'(lambda (all-face-points-geoms)
            (dolist (pointx (progn
                                    (setf final-list nil)
                                    (xox::geom-minmax-box
                                     all-face-points-geoms))
                                final-list) (setf final-list (append
                                                                final-list
                                                                (list (car pointx))))))
            (xox::k-sub-geoms face-geom 0)))
 (append (list (second found-list))
          (list (first found-list))
          (cddr found-list)))


;;;
;;; Returns the coordinates in 3-space of a 0D geom
;;;
(defun cad-point-coords-from-geom (point-geom)
 (mapcar 'car (xox::geom-minmax-box point-geom)))


;;;
;;; Constructs and returns a list of straight line segments
;;; corresponding to the 1D sub-geoms of a given geom, where the
;;; endpoints of the line segments are the 0D sub-geoms of the 1D sub-geoms.
;;; This function is used to copy a boundary-geom which is to be
;;; swept, since (at last check) XOX has occasional problems sweeping
;;; copies of boundary geoms made using xox::copy-geom.
;;;
(defun cad-get-face-edges (face-geom)
 (delete nil
          (mapcar #'(lambda (edge &aux pts)
                    (setf pts (xox::k-sub-geoms edge 0))
                    (if (> (length pts) 1)
                            (apply #'xox::line-geom
                                    (mapcar #'cad-point-coords-from-geom
                                            pts))))
                    (xox::k-sub-geoms face-geom 1))))


;;;
;;; OLD: old method for generating cores, just does projections and
;;; adds them to the casting-manager.
;;;
(defun cad-demo-cores
 (&aux (cores-geom nil))
 (setf cores-geom (select :use (the casting-manager) :test (equal (the slot-name) 'cores)))
 (if cores-geom (kill-part (car cores-geom)))
 (setf cores-geom
          (append
           (mapcan #'(lambda (feature)
                    (mapcar #'(lambda
                                    (face-geom &aux sewn sewn1)
                                    (print `("doing" ,face-geom))
                                    (setf sewn (xox::boundary-geom face-geom))
                                    (print `(dimension of sewn lines is
                                                    ,(or (not sewn) (xox::geom-dimension sewn))))
                                    ;; space-dimension of sewn is 3, dimension is 1
                                    (setf sewn1 (xox::copy-geom face-geom))
```

```
                    (print `(dimension of face is
                                ,(xox::geom-dimension sewn1)))
                    (setf sewn (xox::translation-sweep-geom sewn (get-sweep-path)))
                    ;; dimension of sewn is 2, space-dimension is 3
                    (print `(dimension of sweep is
                                ,(xox::geom-dimension sewn)))
                    (print `(dot-product with normal is
                                ,(cad-normal-dir face-geom)))
                    (cond ((within-tolerance
                            (cad-normal-dir face-geom) 0.0 1.0e-8)
                           (setf sewn 'nil))
                      ((< (cad-normal-dir face-geom) 0.0)
                           (setf sewn (xox::sewn-geom (list
                                                  (xox::invert-geom-orientation
                                                   (xox::copy-geom face-geom))
                                                  (xox::invert-geom-orientation sewn)
                                                  (xox::translate-geom
                                                   (xox::copy-geom face-geom)
                                                   (get-sweep-vector))))))
                      (t
                           (setf sewn (xox::sewn-geom (list
                                                  (xox::copy-geom face-geom)
                                                  sewn
                                                  (xox::translate-geom
                                                   (xox::invert-geom-orientation
                                                    (xox::copy-geom face-geom))
                                                   (get-sweep-vector)))))))
                    (if sewn (setf sewn (xox::halfspace-geom sewn)))
                    sewn
                    )
                (get-surface-geoms feature)))
        (butlast (cad-get-positive-features)))

(mapcan #'(lambda (feature)
        (mapcar #'(lambda (face-geom &aux sewn sewn1)
                    (print `("doing negative feature" ,face-geom))
                    (setf sewn (xox::boundary-geom face-geom))
                    (print `(dimension of sewn lines is
                                ,(or (not sewn) (xox::geom-dimension sewn))))
                    ;; space-dimension of sewn is 3, dimension is 1
                    (setf sewn1 (xox::copy-geom face-geom))
                    (print `(dimension of face is
                                ,(xox::geom-dimension sewn1)))
                    (setf sewn (xox::translation-sweep-geom sewn (get-sweep-path)))
                    ;; dimension of sewn is 2, space-dimension is 3
                    (print `(dimension of sweep is
                                ,(xox::geom-dimension sewn)))
                    (print `(dot-product with normal is
                                ,(cad-normal-dir face-geom)))
                    (cond ((within-tolerance
                            (cad-normal-dir face-geom) 0.0 1.0e-8)
                           (setf sewn 'nil))
                      ((< (cad-normal-dir face-geom) 0.0)
                           (setf sewn (xox::sewn-geom (list
                                                  (xox::invert-geom-orientation
                                                   (xox::copy-geom face-geom))
                                                  (xox::invert-geom-orientation sewn)
                                                  (xox::translate-geom
                                                   (xox::copy-geom face-geom)
                                                   (get-sweep-vector))))))
                      (t
                           (setf sewn (xox::sewn-geom (list
                                                  (xox::copy-geom face-geom)
                                                  sewn
                                                  (xox::translate-geom
                                                   (xox::invert-geom-orientation
                                                    (xox::copy-geom face-geom))
                                                   (get-sweep-vector)))))))
                    (if sewn (setf sewn (xox::halfspace-geom sewn)))
                    sewn
                    )
                (get-surface-geoms feature)))
        (cad-get-negative-features))))
```

Appendix A: Page 4

```
(setf cores-geom (delete nil cores-geom))
(print `(after delete ,cores-geom))

(add-part (the casting-manager) 'cores
          :mixin '(masking-bounded-object)
          :init-list
          (list
           (cons 'display? nil)))

(mapcar #'(lambda (geom &aux name)
            (setq name (format nil "~a" (gensym)))
            (add-part (the casting-manager cores)
                      (read-from-string name)
                      :mixin '(masking-bounded-object)
                      :init-list
                      (list
                       (cons 'geom (xox::copy-geom geom))
                       (cons 'display? nil))))
          cores-geom)

(change (the casting-manager cores draw-color) 'yellow)
(change (the casting-manager cores rendered?) 'shaded)
)


;;;
;;; This function tests the projection methods by creating the
;;; projections of the part features and adding them to the casting-manager.
;;;
(defun test-projections
 (&aux o)
 (setf o (select :use (the casting-manager) :test (equal (the slot-name) 'projections)))
 (if o (kill-part (car o)))

 (add-part (the casting-manager) 'projections
           :mixin '(masking-bounded-object)
           :init-list
           (list
            (cons 'display? 't)))

 (mapcar #'(lambda (feature)
             (add-temp-part (the casting-manager projections)
                            (xox::difference-geom
                             (xox::intersection-geom
                              (xox::difference-geom
                                   (cad-get-union
                                    (rfts-construct-projection feature
                                                               (get-sweep-vector)))
                                   (get-solid-geom feature))
                              (xox::copy-geom (second (the
                                                       casting-manager
                                                       mold blanks))))
                             (xox::copy-geom (the part-model
                                                  solid-part geom)))
                            "pos-proj"))
         (cad-get-positive-features))

 (mapcar #'(lambda (feature)
             (add-temp-part (the casting-manager projections)
                            (xox::difference-geom
                             (xox::intersection-geom
                              (xox::intersection-geom
                                   (xox::difference-geom
                                    (cad-get-union
                                     (rfts-construct-projection feature
                                                                (get-sweep-vector)))
                                    (xox::copy-geom (the part-model
                                                         solid-part geom)))
                                   (xox::copy-geom (car (the
                                                         casting-manager
                                                         mold blanks))))
                              (xox::union-geom
```

```
                                        (xox::copy-geom (the part-model
                                                                solid-part geom))
                                        (get-solid-geom feature)))
                                (xox::copy-geom (the part-model
                                                                solid-part geom))]))
                                "neg-proj"))
        (cad-get-negative-features))

(mapcar #'(lambda (feature)
        (add-temp-part (the casting-manager projections)
                                (xox::difference-geom
                                (xox::intersection-geom
                                (xox::difference-geom
                                        (cad-get-union
                                        (rfts-construct-projection feature
                                                                        (mapcar #'- (get-sweep-vector))))
                                        (get-solid-geom feature))
                                (xox::copy-geom (car (the
                                                                casting-manager
                                                                mold blanks))))
                                (xox::copy-geom (the part-model
                                                                solid-part geom)))
                                "pos-proj"))
        (cad-get-positive-features))

(mapcar #'(lambda (feature)
        (add-temp-part (the casting-manager projections)
                                (xox::difference-geom
                                (xox::intersection-geom
                                (xox::intersection-geom
                                        (xox::difference-geom
                                        (cad-get-union
                                        (rfts-construct-projection feature
                                                                        (mapcar
                                                                        #'- (get-sweep-vector))))
                                        (xox::copy-geom (the part-model
                                                                solid-part geom)))
                                        (xox::copy-geom (second (the
                                                                casting-manager
                                                                mold blanks))))
                                (xox::union-geom
                                        (xox::copy-geom (the part-model
                                                                solid-part geom))
                                        (get-solid-geom feature)))
                                (xox::copy-geom (the part-model
                                                                solid-part geom)))
                                "neg-proj"))
        (cad-get-negative-features))

(mapcar #'(lambda (feature)
        (add-temp-part (the casting-manager projections)
                                (cad-get-union
                                (rfts-construct-projection feature
                                                                (mapcar #'-
                                                                        (get-sweep-vector))))
                                "pos-proj"))
        (cad-get-positive-features))

(mapcar #'(lambda (feature)
        (add-temp-part (the casting-manager projections)
                                (cad-get-union
                                (rfts-construct-projection feature
                                                                (mapcar #'-
                                                                        (get-sweep-vector))))
                                "neg-proj"))
        (cad-get-negative-features))

)

;;;
;;; This function constructs the core pieces necessary to cast the
```

```
;;; current part given the current orientation with respect to the
;;; parting-plane and the current offset parting lines.
;;;
(defun test-cores
 (&aux boundary-geom positive-geom (cores-geom nil) (cores1-geom nil) o)
 (setf o (select :use (the casting-manager) :test (equal (the slot-name) 'cores)))
 (if o
    (progn
;           (xox::free-id (the geom (:from (car o))))
            (kill-part (car o))))

 (add-part (the casting-manager) 'cores
              :mixin '(masking-bounded-object mutable-part)
              :init-list
              (list
               (cons 'display? 't)))

; (setf positive-geom (cad-get-union
;                          (mapcar #'get-solid-geom (cad-get-positive-features))))

 (setf boundary-geom
            (xox::assembly-geom
             (mapcar #'(lambda (g o)
                          (if o
                                 (xox::copy-geom g)
                             (xox::invert-geom-orientation (xox::copy-geom g))))
                        (xox::sub-geoms (the part-model solid-part geom))
                        (xox::sub-geom-orientations (the part-model solid-part geom))
                        )))

 (setf cores-geom
                          (mapcar #'(lambda (feature &aux test junk)
;                                        (setf test (xox::intersection-geom (get-solid-geom feature)
;                                                                                  (xox::copy-geom (the
;                                                                                                  casting-manager mold drag blank geom))))
                                        (if t
                                           (progn
                                             (setf junk (rfts-construct-projection
                                                                  feature (get-sweep-vector)))
                                             (print `(projection of ,feature is ,junk))
                                             (setf junk (cad-get-union junk))
                                             (if (and junk
                                                        (xox::geom-p junk)
                                                        (not (xox::null-geom-p junk)))
                                                       (progn
;                                                        (xox::clear-window *W*)
;                                                        (xox::display-ge junk *W*)
;                                                        (iso)
                                                        (setf junk (xox::difference-geom junk
                                                                                                  (xox::copy-geom (get-node-correct-geom feature))))
;                                                        (xox::clear-window *W*)
;                                                        (xox::display-ge junk *W*)
;                                                        (iso)
                                                        (setf junk (xox::intersection-geom
                                                                              junk
                                                                              (xox::copy-geom
                                                                               (second (the
                                                                                          casting-manager mold blanks)))))
                                                        (print `(junk is ,junk
                                                                              ,(and (xox::geom-p
                                                                                          junk) (not
                                                                                                  (xox::null-geom-p junk)))))
                                                        (if (and junk (xox::geom-p junk)
                                                                  (not (xox::null-geom-p junk)))
                                                              (print `(geom dimension is
                                                                              ,(xox::geom-dimension junk))))

                                                        (if (and junk (xox::geom-p junk) (not
                                                                                                  (xox::null-geom-p junk))
                                                                  (> (xox::geom-dimension junk) 2))
                                                              junk
                                                       (progn
                                                              (xox::free-id junk)
```

Appendix A: Page 7

```
                                                    nil))
                                                )
                                            )
                                        ))
;                                   (xox::free-id test)
                                    )
                                (cad-get-positive-features)))

(print `(after positives cores-geom ,cores-geom))

(mapcar #'(lambda (feature &aux test junk junk1)

        (if (not (feature-classp feature 'radius-feature))
                (let (inter geom)
                 (setf geom (get-node-correct-geom feature))
                 (setf inter (xox::intersection-geom
                                 (construct-boundary geom)
                                 (xox::copy-geom
                                  (second (the
                                          casting-manager mold blanks)))))
                 (if (not (xox::null-geom-p inter))
                        (progn
                         (setf test (xox::intersection-geom
                                     (xox::copy-geom inter)
                                     (xox::copy-geom (the part-model solid-part geom))))
                         (if (delete nil (mapcar #'(lambda (g &aux test-range)
                                                   (sampled-normal-parallel g (the part-model solid-part geom)
                                                                              '(0.0 1.0 0.0) :boundary boundary-geom)
                                                   ) (xox::k-sub-geoms test 2)))
                           (setf cores-geom
                                 (cad-get-union (list cores-geom inter)))
                           (setf cores-geom
                                 (append cores-geom (list inter)))
                          (xox::free-id inter)
                          )
                         (xox::free-id test)
                         )
                  (xox::free-id inter)
                  )
                 (xox::free-id geom)
                 )
                )
        )
      (cad-get-negative-features))


; (print `(cores-geom ,cores-geom ,(and (xox::geom-p cores-geom) (not (xox::null-geom-p cores-geom)))))
; (if (and cores-geom (xox::geom-p cores-geom) (not (xox::null-geom-p cores-geom)))
;    (setf cores-geom (xox::difference-geom
;                        cores-geom
;                        (xox::copy-geom (the part-model solid-part geom)))))

(setf cores1-geom
                 (mapcar #'(lambda (feature &aux test junk)
;                                 (setf test (xox::intersection-geom (get-solid-geom feature)
;                                                                    (xox::copy-geom (the
;                                                                                    casting-manager mold cope blank geom))))
                                 (if t
                                    (progn
                                     (setf junk (rfts-construct-projection feature
                                                                           (mapcar #'- (get-sweep-vector))))
                                     (print `(projection of ,feature is ,junk))
                                     (setf junk (cad-get-union junk))
                                     (if (and junk
                                              (xox::geom-p junk)
                                              (not (xox::null-geom-p junk)))
                                         (progn
                                          (setf junk (xox::intersection-geom
                                                      (xox::difference-geom junk
                                                                            (xox::copy-geom (get-node-correct-geom feature)))
                                                      (xox::copy-geom
```

```
                                                                    (car (the
                                                                          casting-manager mold blanks)))))
                                                        (if (and junk (xox::geom-p junk) (not
                                                                                                  (xox::null-geom-p junk))
                                                                (> (xox::geom-dimension junk) 2))
                                                              junk
                                                         (progn
                                                              (xox::free-id junk)
                                                              nil))
                                                        ))
                                          ))
;                                         (xox::free-id test)
                                          )
                                   (cad-get-positive-features)))

 (mapcar #'(lambda (feature &aux test junk junk1)
            (if (not (feature-classp feature 'radius-feature))
                 (let (inter geom)
                  (setf geom (get-node-correct-geom feature))
                  (setf inter (xox::intersection-geom
                                          (construct-boundary geom)
                                          (xox::copy-geom
                                           (car (the
                                                  casting-manager mold blanks)))))
                  (if (not (xox::null-geom-p inter))
                          (progn
                           (setf test (xox::intersection-geom
                                           (xox::copy-geom inter)
                                           (xox::copy-geom (the part-model solid-part geom))))
                           (if (delete nil (mapcar #'(lambda (g &aux test-range)
                                                          (sampled-normal-parallel g (the part-model solid-part geom)
                                                                                          '(0.0 -1.0 0.0) :boundary boundary-geom)
                                                          ) (xox::k-sub-geoms test 2)))
;                            (setf cores1-geom
;                                   (cad-get-union (list cores1-geom inter)))
                             (setf cores1-geom
                                   (append cores1-geom (list inter)))
                            (xox::free-id inter)
                            )
                           (xox::free-id test)
                           )
                   (xox::free-id inter)
                   )
                  (xox::free-id geom)
                  ))
            )
          (cad-get-negative-features))


; (print `(cores1-geom ,cores1-geom ,(and (xox::geom-p cores1-geom)
;                                         (not (xox::null-geom-p cores1-geom)))))
; (if (and cores1-geom (xox::geom-p cores1-geom) (not (xox::null-geom-p cores1-geom)))
;    (setf cores1-geom (xox::difference-geom
;                              cores1-geom
;                              (xox::copy-geom (the part-model solid-part geom)))))

; (print `(cores-geom ,cores-geom ,(and cores-geom (xox::geom-p
;                                                   cores-geom) (not
;                                                                  (xox::null-geom-p cores-geom)))))
; (print `(cores1-geom ,cores1-geom ,(and cores1-geom (xox::geom-p
;                                                   cores1-geom) (not
;                                                                  (xox::null-geom-p cores1-geom)))))

; (setf cores-geom (cad-get-union (list cores-geom cores1-geom)))
 (setf cores-geom (append cores-geom cores1-geom))

;          (cond ((or (not cores-geom) (not (xox::geom-p cores-geom)) (xox::null-geom-p cores-geom)) cores1-geom)
;                ((or (not cores1-geom) (not (xox::geom-p cores1-geom)) (xox::null-geom-p cores1-geom)) cores-geom)
;                (t (xox::union-geom cores-geom cores1-geom)))

; (change (the casting-manager cores geom) cores-geom)
 (change (the casting-manager cores draw-color) 'yellow)
 (xox::free-id boundary-geom)
```

```
 (xox::free-id positive-geom)
 cores-geom
 )


;;;
;;; this function returns a line geom corresponding to the normal
;;; vector from the parting plane.
;;;
(defun get-sweep-path ()
 (xox::line-geom '(0.0 0.0 0.0)
                 (get-sweep-vector)))


;;;
;;; this function returns the normal vector from the parting plane.
;;; this vector is used as the sweep path when projecting features
;;; during the process of identifying cores.
;;;
(defun get-parting-plane-normal
 (&aux
  (vert (cad-any-vertex-on-geom (the casting-manager
                                     pattern-board geom))))
 (prog1
   (xox::geom-normal vert
                     (the
                       casting-manager
                       pattern-board geom))
  (xox::free-id vert)))


;;;
;;; this function returns the normal vector from the parting plane.
;;; this vector is used as the sweep path when projecting features
;;; during the process of identifying cores.
;;;
(defun get-sweep-vector
 (&aux (ext (* 0.5 (the casting-manager flask-height))))
 (mapcar #'(lambda (point) (* point ext))
         (the casting-manager pattern-board cad-normal)))


;;;
;;; this function returns a line geom corresponding to the normal
;;; vector from the parting plane.
;;;
(defun get-half-sweep-path ()
 (xox::line-geom '(0.0 0.0 0.0)
                 (get-half-sweep-vector)))


;;;
;;; this function returns the normal vector from the parting plane.
;;; this vector is used as the sweep path when projecting features
;;; during the process of identifying cores.
;;;
(defun get-half-sweep-vector ()
 (mapcar #'(lambda (point) (* 0.5 point)) (get-sweep-vector)))


;;;
;;; This function returns the geoms of the positive features.
;;;
(defun get-positive-feature-geoms ()
 (mapcar #'(lambda (object &aux
                   (object-name
                    (intern (with-the-tracing-from (object)
                                                   (the name)))))
                   (eval `(the part-model ,object-name geom)))
        (cad-get-positive-features)))
```

```
;;;
;;; this function returns the 2d geoms associated with a given feature.
;;;
(defun get-surface-geoms
 (object)
; &aux
;          (object-name
;           (intern (with-the-tracing-from (object)
;                                                  (the name))))
; (mapcar #'xox::copy-geom (xox::k-sub-geoms
;                                  (eval `(the part-model ,object-name geom)) 2))
 (mapcar #'xox::copy-geom (xox::k-sub-geoms
                                  (the geom (:from object))  2))
 )


;;;
;;; this function returns the geom associated with a given feature.
;;;
(defun get-solid-geom (object)
 (xox::copy-geom (evaling-the (list 'geom) :from object))
 )


;;;
;;; this function returns the 1d geoms associated with a given feature.
;;;
(defun get-line-geoms
 (object &aux
          (object-name
           (intern (with-the-tracing-from (object)
                                                  (the name)))))
 (mapcar #'xox::copy-geom (xox::k-sub-geoms
                                  (xox::boundary-geom (eval `(the part-model ,object-name geom))) 1)))


;;;
;;; this function returns the 0d geoms associated with a given feature.
;;;
(defun get-point-geoms
 (object &aux
          (object-name
           (intern (with-the-tracing-from (object)
                                                  (the name)))))
 (mapcar #'xox::copy-geom (xox::k-sub-geoms
                                  (eval `(the part-model ,object-name geom)) 0)))


;;;
;;; this function returns the vector dot product between the normal
;;; from the given geom and the current sweep vector (i.e. the normal
;;; from the parting plane).
;;;
(defun cad-normal-dir
 (face-geom &aux vert norm)
 (setf vert (xox::vertex-on-geom face-geom (car
                                                  (cad-get-face-points face-geom)) 100.0))
 (setf norm (xox::geom-normal vert face-geom))
 (xox::free-id vert)
 (vector-dot-product (list-to-vector (mapcar #'(lambda (pt &aux norm)
                                                          (setf norm
                                                                  (vector-norm
                                                                   (list-to-vector (get-sweep-vector))))
                                                          (/ pt norm)) (get-sweep-vector)))
                     (list-to-vector norm)))


;;;
;;; this returns the dot product between the normals of two geoms.
;;;
(defun geom-normal-dot-product (geom1 geom2 &aux vert1 vert2 norm1 norm2)
 (setf vert1 (xox::vertex-on-geom geom1 (car
```

```
                                                (cad-get-face-points geom1)) 100.0))
 (setf norm1 (xox::geom-normal vert1 geom1))
 (xox::free-id vert1)
 (setf vert2 (xox::vertex-on-geom geom2 (car
                                                (cad-get-face-points geom2)) 100.0))
 (setf norm2 (xox::geom-normal vert2 geom2))
 (xox::free-id vert2)
 (vector-dot-product (list-to-vector norm1) (list-to-vector norm2)))

;;;
;;; This function returns the normal of a geom, from an arbitrary
;;; vertex on the geom.
;;;
(defun cad-geom-normal (geom &aux vert norm)
 (setf vert (xox::vertex-on-geom geom (car
                                        (cad-get-face-points geom)) 100.0))
 (setf norm (xox::geom-normal vert geom))
 (xox::free-id vert)
 norm)


(defun cad-geom-tangent (geom point &aux vertex)
 (setf vertex (xox::vertex-on-geom geom
                                point
                                10.0))
 (xox::geom-tangent-space
  geom vertex)
 )


;;;
;;; This function returns an assembly-geom of a given list of geoms.
;;; The geoms in the list are destroyed.
;;;
(defun cad-get-assembly
 (geom-list)
 (setf geom-list (delete nil
                    (mapcar #'(lambda (g)
                                (if (and g (xox::geom-p g) (not
                                                                (xox::null-geom-p g)))
                                    g nil)) geom-list)))
 (xox::assembly-geom geom-list))


;;;
;;; This function returns the intersection-geom of a given list of
;;; geoms. Nil entries in the list are ignored. The geoms in the
;;; given list are destroyed by this function.
;;;
(defun cad-get-intersection
 (geom-list &aux (result nil))
 (dolist (geom geom-list result)
         (if (not result) (progn (print 'init) (setf result geom))
          (if geom (setf result (xox::intersection-geom result geom))))))


(defmethod (cad-construct-mold command-icon)
 (&rest args &aux blip)
 (declare (ignore args))
 (cad-gen-mold))


(defun cad-gen-mold-blanks
 (&aux blip object o lines-geom blanks pieces)
 (setf blip (xox::box-geom (the casting-manager pattern-board-width)
                           (/ (the casting-manager flask-height) 2.0)
                           (the casting-manager pattern-board-length)))
 (setf blip (xox::translate-geom blip (list 0.0 (/ (the
                                                casting-manager flask-height) 4.0) 0.0)))
```

Appendix A: Page

```
; (setf blip (xox::sewn-geom
;             (list (xox::copy-geom (the casting-manager pattern-board geom))
;                   (xox::translation-sweep-geom
;                    (xox::copy-geom (xox::boundary-geom (the
;                                                         casting-manager pattern-board geom)))
;                    (xox::line-geom '(0.0 0.0 0.0)
;                                    (list 0.0 (/ (the casting-manager flask-height) 2.0) 0.0)))
;                   (xox::translate-geom
;                    (xox::copy-geom (the casting-manager
;                                     pattern-board geom))
;                    (list 0.0 (/ (the casting-manager flask-height) 2.0) 0.0)))))
; (xox::orient-geom blip)

(setf blip (xox::halfspace-geom blip))

(setf blanks blip)

(setf blip (xox::box-geom (the casting-manager pattern-board-width)
                          (/ (the casting-manager flask-height) 2.0)
                          (the casting-manager pattern-board-length)))
(setf blip (xox::translate-geom blip (list 0.0 (- (/ (the
                                                        casting-manager flask-height) 4.0)) 0.0)))

(setf blip (xox::halfspace-geom blip))

(setf blanks (list blanks blip))

(change (the casting-manager mold geom)
        (xox::union-geom (xox::copy-geom (car blanks))
                         (xox::copy-geom (second blanks))))


(setf pieces (cad-gen-profile-offset blanks))

(print `(pieces ,pieces))
; (mapcar #'(lambda (p)
;           (add-temp-part (the casting-manager) (xox::assembly-geom p) "pieces"))
;         pieces)

(if pieces
  (let ((new-blanks (mapcar 'xox::copy-geom blanks)))
       (mapcar #'(lambda (piece)
                 (setf piece (xox::intersection-geom piece
                                                     (xox::copy-geom
                                                      (the
                                                           casting-manager mold geom))))
                 (let ((glist (xox::classify-geoms (xox::copy-geom
                                                    piece) (xox::copy-geom (second blanks))
                                                    '(:in) '(:in)))
                       )

                 (print `(glist is ,glist ,(mapcar
                                           #'(lambda
                                              (g)
                                              (and g
                                                   (xox::geom-p g) (not (xox::null-geom-p g)))) glist)))
                 (if (and
                      (not (xox::null-geom-p (car glist)))
                      (> (xox::geom-dimension (car glist)) 2))
                      (setf new-blanks
                            (list
                             (xox::union-geom (car new-blanks)
                                              (xox::copy-geom piece))
                             (xox::difference-geom (second new-blanks)
                                                   (xox::copy-geom piece))))
                      (setf new-blanks
                            (list
                             (xox::difference-geom (car new-blanks)
                                                   (xox::copy-geom piece))
                             (xox::union-geom (second new-blanks)
                                              (xox::copy-geom piece)))))
                 (mapcar #'xox::free-id (delete nil glist))))
       pieces)
```

```
        (mapcar 'xox::free-id blanks)
        (setf blanks new-blanks)
        ))
 (print `(blanks are ,blanks))
 (mapcar #'(lambda (p) (mapcar #'xox::free-id p)) pieces)
 blanks
 )


(defun cad-gen-profile-offset (blanks &aux object pieces lines-geom)
 (setf object (select :use (the casting-manager parting-line)
                      :type 'offset-parting-line-class))
 (if object
   (setf pieces
         (mapcar #'(lambda (cur-line &aux (pt nil)
                                          line1-points line2-points
                                          begin-point end-point cur-vec sheet)
;;;
;;; Project each of the lines into and out of the surface.
;;;
                    (setf lines-geom (mapcar #'(lambda (line &aux cur-vec cur-line)
                                                 (setf begin-point
                                                       (cad-point-coords-from-geom
                                                        (car
                                                         (xox::sub-geoms line))))

                                                 (setf cur-vec
                                                       (xox::line-geom
                                                        (mapcar '- begin-point
                                                                `(0.0 0.0 100.0))
                                                        (mapcar '+ begin-point
                                                                `(0.0 0.0 100.0))
                                                        ))

                                                 (setf cur-line (xox::tangential-sweep-geom
                                                                 (xox::copy-geom line) cur-vec
                                                                 :ref-coords begin-point))

;;; Intersect the sweep of the line with the surface to get the trace
;;; on the surface.

                                                 (xox::intersection-geom cur-line
                                                                         (xox::imbed-geom
                                                                          (xox::sheet-geom
                                                                           100.0 100.0)
                                                                          3))
                                                 )
                                                (xox::k-sub-geoms
                                                 (the geom (:from cur-line)) 1)))
                    (print `(lines-geom is ,lines-geom))

                    (print (mapcar #'(lambda (g) `(,(xox::geom-p g) ,(xox::null-geom-p g) ,(xox::geom-dimension g)
                                                   ,(xox::geom-space-dimension g))) lines-geom))

;;; Connect the start of the first segment with the end of the last segment

                    (if (> (length lines-geom) 1)
                      (progn
                       (setf line1-points
                             (mapcar 'cad-point-coords-from-geom
                                     (xox::sub-geoms (car lines-geom))))
                       (setf line2-points
                             (mapcar 'cad-point-coords-from-geom
                                     (xox::sub-geoms (second lines-geom))))
                       (print `(line1 ,line1-points ,line2-points))
                       (setf begin-point
                             (do* ((line1-point line1-points (rest line1-point)))
                                  ((not (point-in-list (car line1-point)
                                                       line2-points)) (car line1-point))))

                       (setf line1-points (mapcar 'cad-point-coords-from-geom
                                                  (xox::sub-geoms (car
                                                                   (reverse lines-geom)))))
```

Appendix A: Page 14

```
    (setf line2-points (mapcar 'cad-point-coords-from-geom
                                        (xox::sub-geoms (second
                                                        (reverse lines-geom)))))
    (print `(line1 ,line1-points ,line2-points))
    (setf end-point
            (do* ((line1-point line1-points (rest line1-point)))
                    ((not (point-in-list (car line1-point)
                                        line2-points)) (car line1-point))))
    )
  (setf begin-point
            (cad-point-coords-from-geom (car
                                        (xox::sub-geoms (car lines-geom))))
            end-point
            (cad-point-coords-from-geom (second
                                        (xox::sub-geoms (car lines-geom)))))
  )

 (print `(connect from ,begin-point to ,end-point))

 (setf lines-geom (append (list (xox::line-geom
                                        begin-point end-point))lines-geom ))

 (if (the offset-vector (:from cur-line))
   (setf cur-vec
            (xox::line-geom (car (the offset-vector (:from cur-line)))
                                        (second (the offset-vector (:from cur-line))))
            )
  (setf cur-vec
            (xox::line-geom
            `(0.0 0.0 ,(*
                        0.5 (the
                                        casting-manager part-max-extent)))
            `(0.0 0.0 ,(*
                        0.5 (the
                                        casting-manager part-max-extent)))
            ))
  )

 (setf lines-geom (xox::sewn-geom lines-geom))
 (setf sheet
     (xox::imbed-geom
      (xox::invert-geom-orientation
            (xox::sheet-geom 100.0 100.0))
     3))

 (xox::orient-geom lines-geom :underlying-geom sheet)

 (xox::clear-window *W*)
 (xox::display-ge lines-geom *W*)
 (xox::display-ge sheet *W*)
 (xox::update-window *W*)
 (xox::conform-window *W*)
 (xox::update-window *W*)


 (setf lines-geom (xox::replace-sub-geoms sheet (list lines-geom)))
 (print `(sheet was ,sheet lines-geom is ,lines-geom))

 (if (<
    (xox::geom-volume lines-geom) 0.0)
   (xox::invert-geom-orientation lines-geom))

 (xox::clear-window *W*)
 (xox::display-ge lines-geom *W*)
 (xox::update-window *W*)
 (xox::conform-window *W*)

 (setf lines-geom (xox::translation-sweep-halfspace-geom
                        lines-geom
                        cur-vec
                        :ref-coords
                        begin-point
                        ))
```

```
                    (if (<
                        (xox::geom-volume lines-geom) 0.0)
                       (xox::invert-geom-orientation lines-geom))

;                   (xox::clear-window *W*)
;                   (xox::display-ge lines-geom *W*)
;                   (xox::conform-window *W*)

                    (setf lines-geom
                        (xox::intersection-geom lines-geom
                                        (xox::translate-geom
                                         (xox::halfspace-geom
                                              (xox::x-rotate-geom
                                               (xox::imbed-geom
                                                (xox::sheet-geom 100.0 100.0)
                                                3)
                                                :deg (- (the
                                                        draft-angle (:from cur-line)))))
                                              (if
                                                 (the offset-vector (:from cur-line))
                                                 (second (the
                                                        offset-vector (:from cur-line)))
                                              `(0.0 0.0 ,(*
                                                        0.5 (the casting-manager
                                                                part-max-extent)))))))

                    (print '(passed int1))
;                   (xox::clear-window *W*)
;                   (xox::display-ge lines-geom *W*)
;                   (xox::conform-window *W*)

                    (setf lines-geom
                        (xox::intersection-geom lines-geom
                                        (xox::translate-geom
                                         (xox::halfspace-geom
                                              (xox::x-rotate-geom
                                               (xox::imbed-geom
                                                (xox::sheet-geom 100.0 100.0)
                                                3)
                                               :deg (+ 180.0
                                                       (the
                                                        draft-angle (:from cur-line)))))
                                        (if
                                                (the offset-vector (:from cur-line))
                                                (car
                                                (the
                                                 offset-vector (:from cur-line)))
                                              `(0.0 0.0 ,(-
                                                        (*
                                                        0.5 (the casting-manager
                                                                part-max-extent))))))))

;                   (xox::clear-window *W*)
;                   (xox::display-ge lines-geom *W*)
;                   (xox::conform-window *W*)



                    ) object))
  )

; (print `(pieces ,pieces ,(mapcar #'(lambda (piece) (and piece (xox::geom-p piece) (not
;                                                                                 (xox::null-geom-p piece)))) pieces)))

)


(defun cad-gen-mold-offset (blanks)
 (mapcar #'(lambda (offset-part)
    -        (let* (sg
```

list

```
                (offset-geom (evaling-the 'geom) :from offset-part))
                sgl
                (bg (xox::difference-geom
                        (xox::copy-geom
                         (xox::boundary-geom (the
                                                part-model solid-part geom)))
                        (xox::copy-geom offset-geom))))
            (mapcar #'(lambda (g &aux i j n v)
                         (setf i (xox::intersection-geom
                                    (xox::copy-geom g)
                                    (xox::copy-geom offset-geom)))
                         (if (and (not (xox::null-geom-p i))
                                    (> (xox::geom-dimension i) 0))
                                 (progn
                                  (setf v (cad-any-vertex-on-geom i))
                                  (setf v
                                          (let (v1)
                                           (setf v1 (xox::vertex-on-geom
                                                       offset-geom
                                                       (xox::vertex-coords v) 0.001))
                                           (xox::free-id v)
                                           v1))
                                  (print `(vertex is ,(xox::vertex-coords v)))
                                  (setf n (xox::geom-normal v offset-geom :underlying-geom g))
                                  (print `(normal is ,n))
                                  (if (> (xox::geom-dimension
                                          (setf j (xox::intersection-geom
                                                     (xox::copy-geom g)
                                                     (xox::line-geom (xox::vertex-coords v)
                                                                     (mapcar #'(lambda (pt nt) (- pt (* 0.001 nt)))
                                                                             (xox::vertex-coords v) n)))))
                                          0))
                                  (if (xox::vertex-on-geom g
                                                            (mapcar
                                                             #'(lambda (pt nt) (- pt (* 0.001 nt)))
                                                                     (xox::vertex-coords v) n)
                                                            0.0001)

                                     (progn
                                          (print `(adding it))
                                          (setf sg (append sg (list (xox::copy-geom g)))))
                                   (print `(not adding it)))
                                  (xox::free-id j)))
                         (xox::free-id i))
                       (xox::basic-geoms bg)
                       )
            (xox::free-id bg)
            (print `(sg is ,sg))
            (add-temp-part (the casting-manager)
                    (cad-get-generic-union (mapcar
                                            'xox::copy-geom sg))
                    "surf")

            ))
        (select :use (the casting-manager parting-line)
                :type 'parting-line-extension-mixin))
)


(defun new-cad-gen-mold-offset
 (blanks &aux object profile-list surface-list vector)
; (setf object (select :use (the casting-manager parting-line)
;                      :type 'parting-line-extension-mixin))
 (setf object (the casting-manager parting-line extensions-list))
 (if object
;;;
;;; An offset parting is a list of individual parting line extensions...
;;;
        (mapcar #'(lambda (extension)
                    (progn
;;;
;;; Start by sewing parting-line extension segments.
;;;
```

```
(setf profile-list
        (mapcan #'(lambda (segment)
                        (cond ((equal (car segment) 'line)
                              (cad-create-line-geoms-from-points (cdr segment)))
                              ((equal (car segment) 'edge)
                              (list (xox::copy-geom (nth (second segment)
                                                          (xox::k-sub-geoms (the part-model solid-part geom) 1)))))))
                extension))
(print `(profile-list is ,profile-list))

(print `(sewn profile is
;;;
;;; Now sweep each line out from the part.
;;;
(setf surface-list nil)
(do ((line-segments profile-list (rest line-segments)))
      ((null line-segments))
      (print `(point is ,(cad-point-coords-from-geom
                              (car (xox::sub-geoms
                                      (car line-segments))))
                        vertex is ,(xox::vertex-on-geom
                              (the part-model
                                 solid-part geom)
                              (cad-point-coords-from-geom
                               (car (xox::sub-geoms
                                      (car line-segments))))
                              (get-max-extent))))
      (setf vector (mapcar #'(lambda (p)
                              (*
                               (get-max-extent) p))
                        (xox::geom-normal
                              (xox::vertex-on-geom
                              (the part-model
                                 solid-part geom)
                              (cad-point-coords-from-geom
                               (car (xox::sub-geoms
                                      (car line-segments))))
                              (get-max-extent))
                              (the part-model
                                 solid-part geom)
                              )))
      (setf vector `(0.0 0.0 ,(get-max-extent)))
      (setf surface-list
            (append surface-list
                  (list
                  (xox::difference-geom
                   (xox::tangential-sweep-geom
                   (xox::copy-geom (car line-segments))
                   (xox::line-geom (cad-point-coords-from-geom
                                    (car
                                     (xox::sub-geoms (car line-segments))))
                                    (mapcar '+
                                            (cad-point-coords-from-geom
                                             (car (xox::sub-geoms (car line-segments))))
                                            vector))
                   :ref-coords (cad-point-coords-from-geom
                                (car (xox::sub-geoms
                                      (car line-segments)))))
                  (xox::copy-geom (the part-model
                                       solid-part geom))))))
      (if (> (length line-segments) 1)
        (let* ((tan1 (car (cad-geom-tangent (car line-segments)
                                    (cad-point-coords-from-geom
                                    (second
                                     (xox::sub-geoms (car line-segments)))))))
               (tan2 (car (cad-geom-tangent (second line-segments)
                                    (cad-point-coords-from-geom
                                    (car
                                     (xox::sub-geoms (second line-segments)))))))
               (cross-product (direction-cosines
                              (vector-cross-product
                               (direction-cosines (list-to-vector tan1))
                               (direction-cosines (list-to-vector tan2)))))
```

```
                                    (dot-product (vector-dot-product cross-product
                                                                     (direction-cosines (list-to-vector vector)))))
                                  (print `(tan1 ,tan1 tan2 ,tan2
                                          vector ,vector
                                          cross-product
                                          ,cross-product
                                          dot-product ,dot-product))
                                  (if (not (within-tolerance (abs dot-product)
                                                             1.0 1.0e-3))
                                    (setf surface-list
                                          (append surface-list
                                                  (list
                                                   (xox::difference-geom
                                                    (xox::revolution-sweep-geom
                                                     (xox::line-geom (cad-point-coords-from-geom
                                                                      (car
                                                                       (xox::sub-geoms (second line-segments))))
                                                                      (mapcar '+
                                                                              (cad-point-coords-from-geom
                                                                               (car
                                                                                (xox::sub-geoms (second line-segments))))
                                                                              vector))
                                                     (acos dot-product)
                                                     (vector-to-list cross-product))
                                                    (xox::copy-geom (the
                                                                     part-model solid-part geom)))))))))
                                  ))) object)
  nil)
 surface-list
 )))

(defun old-cad-gen-mold-offset
 (blanks &aux result object lines-geom lines-list connecting-points)

 (setf object (select :use (the casting-manager parting-line)
                      :type 'parting-line-extension-mixin))

 (if object
   (let (cur-line (cap nil)
                  (sheet nil)
                  (cap1 nil)
                  (ocap nil)
                  (solid-surf nil))
;;;
;;; For each sub-list of points on a single surface...
;;;
        (do ((points-list (cdar (the
                                 casting-manager
                                 parting-line extensions-list)))
             points-sublist)
            ((< (length points-list) 2))
            (print `(points list is ,points-list))
            (if (or (< (length points-list) 3)
                    (not
                     (setf solid-surf
                           (find-containing-surface
                            (list (car points-list)
                                  (second points-list)
                                  (third points-list))
                            (the part-model solid-part geom)))))
                (setf solid-surf
                      (find-containing-surface
                       (list (car points-list) (second points-list))
                       (the part-model solid-part geom))))
            (setf points-sublist nil)
            (print `(found containing surface ,solid-surf))
            (dolist (point points-list)
                    (let* ((c
                            (xox::classify-geoms (xox::point-geom point)
                                                 (xox::copy-geom solid-surf)
                                                 '(:in :on) '(:in :on)))
                            (co (and (xox::null-geom-p (first c))
                                     (xox::null-geom-p (second c))
```

```
                    (xox::null-geom-p (fourth c))
                    (xox::null-geom-p (fifth c))
                    )))
            (mapcar #'(lambda (g) (if g (xox::free-id g))) c)
            (if (not co)
                (setf points-sublist (append points-sublist (list point)))
                (return))))

    (mapcar #'(lambda (l) (setf points-list (rest points-list)))
            (rest points-sublist))
    (setf connecting-points (append connecting-points (list
                                                        (car points-list))))
    (print `(points sublist is ,points-sublist))
    (print `(points list is ,points-list))

;;;
;;; Project each of the lines into and out of the surface.
;;;

    (setf lines-geom nil)
    (do* ((plist points-sublist (rest plist))
          (p (car plist) (car plist)))
          ((< (length plist) 2))
          (setf lines-geom (append lines-geom
                                   (list (xox::line-geom p (second plist)))))
          )

    (setf lines-list (append lines-list (list (xox::sewn-geom
                                                (mapcar
                                                  'xox::copy-geom lines-geom)))))
    (print `(lines-list is ,lines-list))
    (print `(lines-geom is ,lines-geom))

    (setf cap (xox::sewn-geom
               (mapcar #'(lambda (g)
                         (xox::translation-sweep-geom g
                                                       (xox::line-geom
                                                        (mapcar #'(lambda (pt)
                                                                  (* pt -2.0 (the casting-manager part-max-extent)))
                                                                (xox::geom-normal
                                                                 (xox::vertex-on-geom solid-surf
                                                                                      (cad-point-coords-from-geom g)
                                                                                      100.0)
                                                                 solid-surf))
                                                        (mapcar #'(lambda (pt)
                                                                  (* pt 2.0 (the casting-manager part-max-extent)))
                                                                (xox::geom-normal
                                                                 (xox::vertex-on-geom solid-surf
                                                                                      (cad-point-coords-from-geom g)
                                                                                      100.0)
                                                                 solid-surf)))))
                         lines-geom)))

    (print `(projection is ,cap))

    (add-temp-part (the casting-manager) (xox::copy-geom cap) "cap")

    (setf cap1 (cad-get-generic-union
               (mapcar #'(lambda
                         (face-geom &aux sewn sewn1)
                         (cond ((within-tolerance
                                 (vector-dot-product
                                  (list-to-vector (cad-geom-normal face-geom))
                                  (list-to-vector '(0.0 -1.0 0.0))) 0.0 1.0e-8)
                                (setf sewn 'nil))
                               (t
                                (progn
                                 (setf sewn (xox::sewn-geom
                                             (list
                                              (xox::copy-geom face-geom)
                                              (xox::translation-sweep-geom
                                               (xox::copy-geom
                                                (xox::boundary-geom face-geom))
```

```
                                                    (xox::line-geom
                                                     '(0.0 0.0 0.0)
                                                     (mapcar
                                                      #'(lambda (pt)
                                                              (* pt
                                                                (the
                                                                 part-model casting-manager part-max-extent))) '(0.0 -1.0 0.0))))
                                                    (xox::translate-geom
                                                    (xox::invert-geom-orientation
                                                     (xox::copy-geom face-geom))
                                                    (mapcar #'(lambda
                                                                (pt)
                                                                (* pt
                                                                      (the part-model casting-manager part-max-extent))) '(0.0 -1.0
0.0))))))
                                        (xox::orient-geom sewn)
                                        (cond
                                         ((< (vector-dot-product (list-to-vector (cad-geom-normal face-geom))
                                                                 (list-to-vector '(0.0 -1.0 0.0))) 0.0)
                                          (setf sewn (xox::halfspace-geom
                                                      (xox::invert-geom-orientation sewn))))
                                         (t (setf sewn (xox::halfspace-geom sewn)))))))
                                sewn
                                )
                        (xox::k-sub-geoms cap 2))))

        (xox::free-id cap)
        (print `(cap1 is ,cap1))

        (if (and cap1 (not (xox::null-geom-p cap1)))
              (progn
               (setf cap (xox::intersection-geom cap1
                                                 (xox::copy-geom (car blanks))))
               (setf cap (xox::difference-geom cap
                                                (xox::copy-geom (the
                                                                 part-model
                                                                 solid-part geom))))
               (print `(passed difference))
               (print `(basic-geoms connection are
                                ,(mapcar #'(lambda (bg &aux c ans)
                                                 (setf c (xox::classify-geoms
                                                          (xox::copy-geom bg)
                                                          (xox::copy-geom solid-surf)
                                                          '(:on) '(:on)))
                                                 (setf ans (if (or (not
                                                                    (xox::null-geom-p
                                                                          (second c)))
                                                                   (not
                                                                    (xox::null-geom-p
                                                                          (fifth c))))
                                                                  t nil))
                                                 (xox::free-id (second c))
                                                 (xox::free-id (fifth c))
                                                 ans)
                                                (xox::basic-geoms cap))))

               (dolist (geom (xox::basic-geoms cap))
                       (setf ocap (xox::classify-geoms
                                   (xox::copy-geom geom)
                                   (xox::copy-geom solid-surf)
                                   '(:on) '(:on)))
                       (if (or (not (xox::null-geom-p (second ocap)))
                               (not (xox::null-geom-p (fifth ocap))))
                          (setf cap1 (xox::copy-geom geom)))
                       (xox::free-id (second ocap))
                       (xox::free-id (fifth ocap))
                       )

               (xox::free-id cap)
               (setf result (append result (list cap1)))
               )
        ))
```

```
        result
        )
  )
 )


(defun cad-gen-mold
 (&aux object)

 (change (the casting-manager mold cope geom)
         (xox::copy-geom (car (the casting-manager mold blanks))))
 (change (the casting-manager mold drag geom)
         (xox::copy-geom (second (the casting-manager mold blanks))))

 (if (select :use (the casting-manager) :test (equal (the slot-name) 'cores))
   (let ((cores-geom (the casting-manager cores geom)))
        (print '(subtracting cores from drag))

        (change (the casting-manager mold cope geom)
                (xox::difference-geom
                 (xox::difference-geom (the casting-manager mold cope geom)
                                       (xox::copy-geom (the part-model
                                                            solid-part geom)))
                 (xox::copy-geom cores-geom)))
        (change (the casting-manager mold drag geom)
                (xox::difference-geom
                 (xox::difference-geom (the casting-manager mold drag geom)
                                       (xox::copy-geom (the part-model
                                                            solid-part geom)))
                 (xox::copy-geom cores-geom)))
        ))
 )


(defun cad-gen-mold-halfs (&aux object cores-geom pattern-geom)
 (the casting-manager mold blanks)
 (setf pattern-geom
        (cad-get-union
        (append
         (list (xox::copy-geom (the part-model solid-part geom))
               (if (sub-part-exists (the casting-manager) 'cores)
                   (xox::copy-geom (the casting-manager cores geom))))
         (mapcar #'(lambda (g)
                     (xox::copy-geom (the geom (:from g))))
                 (butlast (cdr (select :use (the casting-manager rigging)))))
         )))
 (print `(pattern-geom is ,pattern-geom))
 (list
  (xox::difference-geom (xox::copy-geom (car (the
                                              casting-manager
                                              mold blanks)))
                        (xox::copy-geom pattern-geom))
  (xox::difference-geom (xox::copy-geom (second (the
                                                     casting-manager mold blanks)))
                        (xox::copy-geom pattern-geom)))
 )


;;;
;;; this function computes the "maximum extent" of the part model
;;; this is defined as the diagonal of the min-max box of the
;;; part-model's geom
;;;
(defun get-max-extent ()
 (sqrt (apply '+
              (mapcar #'(lambda (axis &aux x)
                                  (setf x
```

```
                                        (apply '- axis))
                                (* x x))
                (xox::geom-minmax-box (the part-model
                                        solid-part geom))))))


;;;
;;; This function tests for the existence of a sub-part of a given
;;; part having a given name. If the named sub-part exists, the
;;; function returns t, otherwise it returns nil.
;;;
(defun sub-part-exists (part sub-part-name &aux test-name)
 (if (evaling-the (list sub-part-name) :from part :error-p nil) t nil)
 )


;;;
;;; This function destroys the sub-parts of a given part. The part
;;; itself is not deleted.
;;;
(defun kill-sub-parts (part)
 (mapcar #' kill-part (cdr (select :use part))))


;;;
;;; This function creates and returns a list of line geoms defined by
;;; a list of corrdinates. The endpoints of the line geoms are
;;; defined by the pairs of coordinates in order, with the last
;;; connecting to the first. The order of the first two lines are
;;; reversed, so that the orientations of the line geoms are
;;; consistent (in accordance with a previous XOX bug regarding
;;; sweeps; it is not known if this is still necessary; I'd guess it isn't).
;;;
(defun cad-create-line-geoms-from-points (face-point-set &aux found-list)
 (setf found-list
        (do* ((face-point-set-l face-point-set)
            (first-point (first face-point-set-l))
            (first-point-save first-point)
            (second-point (second face-point-set-l))
            (line-geom-set nil))
           ((null face-point-set-l) line-geom-set)
           (setf line-geom-set
                 (append line-geom-set (list
                                        (xox::line-geom first-point second-point))))
           (setf face-point-set-l (rest face-point-set-l))
           (if (equal (length face-point-set-l) 1)
                (setf first-point (car face-point-set-l)
                    second-point first-point-save)
            (setf first-point (first face-point-set-l)
                  second-point (second face-point-set-l)))))
 found-list)


;;;
;;; This function returns the union-geom of a given list of
;;; 3D geoms. Nil entries and entries of dimension less than 3 in the list are ignored. The geoms in the
;;; given list are destroyed by this function.
;;;
(defun cad-get-union
 (geom-list &aux (result nil))
 (print`(cad-get-union of ,geom-list))
 (dolist (geom geom-list result)
        (if (and (not result)
                 geom
                 (xox::geom-p geom)
                 (not (xox::null-geom-p geom))
                 (> (xox::geom-dimension geom) 2))
            (setf result geom)
           (if (and geom
                    (xox::geom-p geom)
                    (not (xox::null-geom-p geom))
                    (> (xox::geom-dimension geom) 2))
```

```
                    (progn
                     (setf result (xox::union-geom result geom)))))))


(defun cad-get-generic-union
 (geom-list &aux (result nil))
 (dolist (geom geom-list result)
          (if (and (not result)
                   geom
                   (xox::geom-p geom)
                   (not (xox::null-geom-p geom)))
            (setf result geom)
           (if (and geom
                    (xox::geom-p geom)
                    (not (xox::null-geom-p geom)))
                    (progn
                     (setf result (xox::union-geom result geom)))))))


;;;
;;; This function returns whether two lists of coordinates are
;;; equivalent. Equivalence is defined by the two lists having the
;;; same coordinate values (within 1.0e-8 tolerance) in any order.
;;;
(defun point-lists-equal (l1 l2 &aux (i 0))
 (if (not (= (length l1) (length l2))) nil
  (if (< (length l1) 1) t
   (progn
;          (print `(checking ,l1 against ,l2))
          (if (> (do ((pt (car l2))
                      (pl l2)
                      (j 1))
                     ((null pl) i)
                     (if (not (member nil (mapcar #'(lambda (p1 p2) (within-tolerance p1 p2 1.0e-8)) (car
                                                                                                        l1) pt)))
                       (setf i j))
                     (setf j (+ j 1))
                     (setf pl (cdr pl))
                     (setf pt (car pl))) 0)
            (let ((nl1 l1) (nl2 l2))
;             (print `(matched first))
             (point-lists-equal (cdr nl1) (delete (nth (- i 1) nl2) nl2 :test 'equal)))
           nil)))))


;;;
;;; This function adds a "temporary" part to a given object. The
;;; function is given the location in the earn-space tree for the new
;;; part, the geom for the part, and a name template for the part.
;;;
(defun add-temp-part (part geom name-template)
 (add-part part
           (read-from-string (format nil "~a" (gensym name-template)))
           :mixin '(rons-temp-part-mixin)
           :init-list
           (list
            (cons 'geom1 geom)
            (cons 'display? nil))))


;;;
;;; Function for creating the main-parting-line geom. Called when
;;; the geom of 'the casting-manager parting-line main-parting-line'
;;; is referenced. This function returns a geom created by
;;; intersecting the pattern-board geom with the part.
;;;
(defun cad-create-main-parting-line ()
 (xox::intersection-geom
  (xox::copy-geom (the part-model solid-part geom))
  (xox::copy-geom (the casting-manager
                       pattern-board geom))))
```

```
;;;
;;; This function is displays the casting-manager sub-parts. This
;;; function is called by the EAM module when a part is called into
;;; the passive display.
;;;
(define-part-method (draw-casting-features casting-manager-class)()
 (the eam-space part-model solid-part geom)
 (draw-part !pattern-board)
; (print `(drawing main-parting-line))
; (draw-part (the parting-line main-parting-line))
; (print `(drawing extensions))
; (if (the parting-line extensions-list)
;    (mapcar #'(lambda (sub)
;                      (print `(drawing ,sub))
;                      (with-the-tracing-from (sub)
;                                                  (change !display? t))
;                      (draw-part sub))
;              (select :use (the
;                                parting-line)
;                        :type 'parting-line-extension-mixin)))
 )


(defun cad-gen-pattern-board (&aux geom-list found-bottom)
 (dolist (geom (xox::k-sub-geoms (the casting-manager mold drag geom) 2)
                found-bottom)
          (if (and (within-tolerance 1.0 (second (cad-geom-normal geom)) 1.0e-8)
                   (not (member nil (mapcar #'(lambda (g)
                                                  (within-tolerance (second
                                                                      (cad-point-coords-from-geom g))
                                                                      (- (/ (the
                                                                              casting-manager flask-height) 2.0))
                                                                      1.0e-8))
                                                 (xox::k-sub-geoms geom 0)))))
             (setf found-bottom geom)))
 (dolist (geom (xox::k-sub-geoms (the casting-manager mold drag geom) 2)
                (cad-get-generic-union geom-list))
          (if (and (not (equal geom found-bottom))
                   (let ((glist (xox::classify-geoms (xox::copy-geom found-bottom)
                                                     (xox::copy-geom geom)
                                                     '(:on) '(:on)))
                         rv)
                     (if (xox::null-geom-p (second glist)) (setf rv t))
                     (mapcar #'xox::free-id (delete nil glist))
                     rv))
             (setf geom-list (append (list (xox::copy-geom geom)) geom-list)))))



(defun cad-make-core-print
 (&aux prints sewn vec)
 (if (not (sub-part-exists (the casting-manager) 'cores))
    (progn
          (pop-up-message "Construct cores first.")
          nil)
  (progn
    (cad-get-union
     (let (ans)
             (setf prints
                     (xox::difference-geom
                      (xox::copy-geom
                       (xox::boundary-geom (the casting-manager cores geom)))
                      (xox::copy-geom
                       (xox::boundary-geom (the part-model solid-part geom)))))
             (setf ans
                     (cad-get-union
                      (mapcar #'(lambda (face-geom)
                                        (print `(normal is
                                                        ,(cad-geom-normal face-geom)))
                                        (setf vec (mapcar #'(lambda (v d)
                                                              (* v -0.5
```

```
                                                    (abs (-
                                                        (second d) (car d)))))
                                                (cad-geom-normal face-geom)
                                                (xox::geom-minmax-box (the casting-manager cores geom))))
                                (setf sewn (xox::sewn-geom (list
                                                (xox::copy-geom face-geom)
                                                (xox::translation-sweep-geom
                                                 (xox::copy-geom
                                                  (xox::boundary-geom face-geom))
                                                 (xox::line-geom
                                                  '(0.0 0.0 0.0)
                                                  vec))
                                                (xox::translate-geom
                                                 (xox::invert-geom-orientation
                                                  (xox::copy-geom face-geom))
                                                 vec))))
                                (xox::orient-geom sewn)
                                (cond
                                 ((< (vector-dot-product (list-to-vector (cad-geom-normal face-geom))
                                                         (list-to-vector vec)) 0.0)
                                  (xox::halfspace-geom
                                   (xox::invert-geom-orientation sewn)))
                                  (t (xox::halfspace-geom sewn))))
                        (xox::basic-geoms prints))))
            (xox::free-id prints)
            ans)))
  )
 )


(defun update-casting-features()
 (if (the casting-manager part-orientation-formula)
    (progn
          (change-formula
           (the part-model starting-block orientation)
           (the casting-manager part-orientation-formula))
          (interactive-smash-variable
           (the part-model starting-block)
           :attribute-name 'orientation)
          (interactive-smash-variable
           (the part-model starting-block solid-part)
           :attribute-name 'geom)
          (interactive-smash-variable
           (the casting-manager parting-line main-parting-line)
           :attribute-name 'geom)
;         (the eam-space part-model solid-part geom)
;         (the eam-space casting-manager parting-line
;             main-parting-line geom)
          (draw-part (the casting-manager pattern-board))
;         (draw-part (the casting-manager parting-line main-parting-line))
          (add-offset-parting-lines (the casting-manager parting-line))
          ))
 )


(defun find-containing-surface (point-list part-geom
                                        &aux (surf-list (xox::k-sub-geoms part-geom 2))
                                        (orient-list (xox::sub-geom-orientations part-geom))
                                        return-surf)
 (dolist (surf surf-list return-surf)
          (if (not (member nil
                        (mapcar #'(lambda (pt &aux c p)
                                (setf c (xox::classify-geoms
                                        (xox::point-geom pt)
                                        (xox::copy-geom surf)
                                        '(:in :on) '(:in :on)))
;;;
```

```
;;; Return whether the geom contains the point, and whether the
;;; normal on the geom at that point has a x or z component.
;;;
                                        (setf p (and (not (and (xox::null-geom-p (car c))
                                                               (xox::null-geom-p (second c))))
                                                     (let ((n
                                                            (xox::geom-normal
                                                             (xox::vertex-on-geom surf
                                                                                  pt
                                                                                  0.01)
                                                             surf)))
                                                      (or
                                                       (not
                                                            (within-tolerance (car n) 0.0 1.0e-8))
                                                       (not
                                                            (within-tolerance (third n) 0.0 1.0e-8))))))
                                        (mapcar #'xox::free-id c)
                                        p)
                                       point-list)))
            (if (car orient-list)
                (setf return-surf (xox::copy-geom surf))
                (xox::invert-geom-orientation
                (setf return-surf (xox::copy-geom surf)))))
            (setf orient-list (rest orient-list))))


(defun find-connecting-surface-not-on-part (piece point lines &aux result)
 (dolist (geom (xox::k-sub-geoms piece 2) result)
          (let ((c (xox::classify-geoms
                    (xox::copy-geom geom)
                    (xox::copy-geom lines)
                    '(:in :on) '(:in :on))))
           (if (and (xox::null-geom-p (first c))
                    (not (xox::null-geom-p (second c))))
                (let ((c1 (xox::classify-geoms
                           (xox::copy-geom geom)
                           (xox::point-geom point)
                           '(:in :on) '(:in :on))))
                 (print `(not on point ,(mapcar #'(lambda (g)
                                                    (or (not g)
                                                        (xox::null-geom-p g))) c1)))
                 (if (or (not (xox::null-geom-p (first c1)))
                         (not (xox::null-geom-p (second c1)))
                         (not (xox::null-geom-p (fourth c1)))
                         (not (xox::null-geom-p (fifth c1))))
                     (setf result (xox::copy-geom geom)))
                 (xox::free-id (first c1))
                 (xox::free-id (second c1))
                 (xox::free-id (fourth c1))
                 (xox::free-id (fifth c1))))
           (xox::free-id (first c))
           (xox::free-id (first c)))))


(defun sweep-surface-normal-to-itself (surf &aux s1 normal)
; (setf normal (mapcar
;                #'(lambda (p)
;                  (- (* p (the
;                           casting-manager part-max-extent)))) (cad-geom-normal surf)))
 (setf normal (mapcar '- (cad-geom-normal surf)))
 (print `(normal is ,normal))
 (setf s1 (xox::sewn-geom
           (list (xox::copy-geom surf)
                 (xox::translation-sweep-geom
                  (xox::copy-geom
                   (xox::boundary-geom surf))
                  (xox::line-geom '(0.0 0.0 0.0) normal))
                 (xox::translate-geom
                  (xox::copy-geom surf) normal))))
 (xox::orient-geom s1)
 (xox::halfspace-geom s1)
```

```
)


(defun cad-make-core-print (feature
                                    &aux )
 (setf print-surface
          (nth (find-closest-geom-face feature 1)
               (xox::k-sub-geoms (the geom (:from feature)) 1)))
 (add-part feature (read-from-string (format nil "print~~a" (gensym)))
            :mixin '(masking-bounded-object mutable-part)
            :init-list
            (list
             (cons 'display? 't)
             (cons 'geom1 (sweep-surface-normal-to-itself print-surface)))
            )
 )

(defun cad-seperate-cores ()
 (mapcar #'(lambda (g)
              (add-part (the casting-manager cores)
                                (read-from-string (format nil "core~~a" (gensym)))
                                :mixin '(masking-bounded-object mutable-part)
                                :init-list
                                (list
                                 (cons 'display? 't)
                                 (cons 'geom1 (xox::copy-geom g)))
                                ))
           (xox::basic-geoms (the casting-manager cores geom)))
 )

(defun cad-stl-blends ()
 (dump-geom-as-stl
  (xox::assembly-geom
   (mapcar #'(lambda (p)
                    (xox::copy-geom (the geom (:from p))))
           (select :use (the part-model) :type 'radius-feature)))
  "/kelly1/rds/rds/radius.stl")
 (dump-geom-as-stl
  (xox::assembly-geom
   (mapcar #'(lambda (p)
                    (xox::copy-geom (the geom (:from p))))
           (select :use (the part-model) :type 'fillet-feature)))
  "/kelly1/rds/rds/fillet.stl")
 )


;(define-part-method (draw-part main-parting-line-class) (&rest args)
; (if (xox::null-geom-p !geom) (pop-up-message "Part and pattern board do not intersect.")
;   (progn
;     (change !display? t)
;     (draw-self self)
;     (really-draw-part self :DRAW-SUBPARTS? DRAW-SUBPARTS? :TYPE TYPE
;                                :LINE-TYPE LINE-TYPE)
;     (draw-part self args)
;     )))


(defun point-in-list (point point-list)
 (do ((point2 point-list (rest point2)))
    ((or (not point2)
         (within-tolerance
          (vector-norm (list-to-vector
                                (mapcar '- point (car point2))))
          1.0e-3))
    (return (car point2)))))


(defun points-equal (p1 p2)
 (within-tolerance
          (vector-norm (list-to-vector
                                (mapcar '- p1 p2)))
          1.0e-3))
```

```
(defun get-end-points (basic-geoms &aux points-list)
                    (setf points-list
                        (mapcan #'(lambda (g &aux v1 v2 range ret)
                                          (setf range (xox::geom-params-range g))
                                          (setf v1 (xox::vertex-for-params g
                                                                                    (mapcar 'car range)))
                                          (setf v2 (xox::vertex-for-params g
                                                                                    (mapcar 'car (mapcar 'last range))))
                                          (setf ret (list (xox::vertex-coords v1)
                                                                  (xox::vertex-coords v2)))
                                          (xox::free-id v1)
                                          (xox::free-id v2)
                                          ret) basic-geoms))
;                   (print `(points-list ,points-list))
                    (setf points-list
                        (delete nil
                                  (mapcar #'(lambda (p)
                                                  (print `(p is ,p member p is ,(member p points-list :test 'points-equal)
;                                                                 member member p is ,(member p (cdr (member p points-list :test 'points-equal)) :test 'points-
equal)))
                                                  (if (not (member p (cdr (member p points-list :test 'points-equal)) :test 'points-equal)) p)) points-list)))
)


(defun construct-match-plate
 (&aux (bounding-box (xox::geom-minmax-box (the part-model solid-part
                                                                    geom))) o p)
 (setf o (select :use (the casting-manager) :test (equal (the slot-name) 'match-plate)))
 (if o
    (progn
            (kill-part (car o))))

 (setf bounding-box
            `((,(- (the casting-manager part-max-extent))
              ,(the casting-manager part-max-extent))
             (,(- (the casting-manager part-max-extent))
              ,(the casting-manager part-max-extent))
             (,(- (the casting-manager part-max-extent))
              ,(the casting-manager part-max-extent))))

 (setf p
            (add-part (the casting-manager) 'match-plate
                        :mixin '(masking-bounded-object)
                        :init-list
                        (list
                         (cons 'geom (xox::difference-geom
                                              (xox::difference-geom
                                               (xox::halfspace-geom
                                                (xox::box-geom
                                                 (- (the casting-manager
                                                            pattern-board-width) 0.75)
                                                 (+ 0.5 (the casting-manager flask-height))
                                                 (- (the casting-manager
                                                            pattern-board-length) 0.75)
                                                ))
                                               (xox::translate-geom
                                                (xox::copy-geom (the casting-manager mold drag geom))
                                                '(0.0 -0.375 0.0)))
                                              (xox::translate-geom
                                               (xox::copy-geom (the casting-manager mold cope geom))
                                               '(0.0 0.375 0.0))))
                         (cons 'draw-color 'yellow)
                         (cons 'display? 't))))


 (dump-geom-as-stl (the geom (:from p)) "/kelly1/rds/rds/matchplate.stl")
 )
```

We claim:

1. A method for producing a mold pattern for making a cast part, comprising the steps of:

(a) defining the structure of a part to be cast in terms of computer aided design system data;

(b) selecting a parting surface for said part defined by said computer aided design system data, said parting surface defining a selected orientation of said part within a mold;

(c) defining core requirements for said part to be cast by first sweeping each positive feature of the part to said parting surface, subtracting said part from the projection on said parting surface and adding any remaining volume to the core, and then by sweeping negative features of said part away from said parting surface to the top or bottom of said mold, subtracting said negative features from said projection and intersecting the remainder of said part and adding any remaining volume to said core;

(d) successively selecting alternative parting surfaces for said part and defining the corresponding core requirements whereby an optimum parting surface having minimum core requirements is defined, (e) molding core pieces defined by said core requirements defined at said optimum parting surface for said part to be cast; and (f) assembling said core pieces in a mold box to define the mold pattern for said part.

2. A method for producing a mold pattern for making a cast part, comprising the steps of:

(a) defining the structure of a part to be cast in terms of computer aided design system data;

(b) selecting a parting surface for said part defined by said computer aided design system data, said parting surface defining a selected orientation of said part within a mold;

(c) defining first core requirements for said part by first sweeping each positive feature of said part to said parting surface, subtracting said part from said projection on said parting surface and adding any remaining volume to the core, and then sweeping negative features away from said parting surface to the top or bottom of said mold, subtracting the negative features from said projection and intersecting the remainder of said part and adding any remaining volume to the core;

(d) successively selecting alternative parting surfaces for said part and defining the corresponding core requirements whereby an optimum parting surface having minimum core requirements is defined;

(e) defining second core requirements for each first core requirement defined for said part for said optimum parting surface by repeating step (c) for each said first core requirement defined at said optimum parting surface;

(f) molding core pieces defined by said first and second core requirements defined at said optimum parting surface; and (g) assembling said core pieces in a mold box to define the mold pattern for said part.

* * * * *